(12) United States Patent
Schonfeld et al.

(10) Patent No.: US 11,263,896 B2
(45) Date of Patent: Mar. 1, 2022

(54) METHOD AND SYSTEM FOR DETECTING JAYWALKING OF VULNERABLE ROAD USERS

(71) Applicant: B&H Licensing Inc., Berkeley, CA (US)

(72) Inventors: Uri Schonfeld, San Jose, CA (US); Bastien Beauchamp, Montreal (CA); Jean Francois Viens, Quebec (CA)

(73) Assignee: B&H Licensing Inc., Berkeley, CA (US)

( * ) Notice: Subject to any disclaimer, the term of this patent is extended or adjusted under 35 U.S.C. 154(b) by 0 days.

(21) Appl. No.: 17/166,846

(22) Filed: Feb. 3, 2021

(65) Prior Publication Data

US 2021/0312795 A1  Oct. 7, 2021

Related U.S. Application Data

(60) Provisional application No. 63/129,356, filed on Dec. 22, 2020, provisional application No. 63/005,659, filed on Apr. 6, 2020.

(51) Int. Cl.
*G08G 1/005* (2006.01)
*G08G 1/056* (2006.01)
(Continued)

(52) U.S. Cl.
CPC ............ *G08G 1/005* (2013.01); *G08G 1/056* (2013.01); *G08G 1/166* (2013.01); *H04W 4/027* (2013.01); *H04W 4/029* (2018.02)

(58) Field of Classification Search
None
See application file for complete search history.

(56) References Cited

U.S. PATENT DOCUMENTS

| 9,421,909 B2 | 8/2016 | Strickland et al. |
| 10,007,269 B1 | 6/2018 | Gray |

(Continued)

FOREIGN PATENT DOCUMENTS

| CN | 102739301 | 10/2012 |
| CN | 102682594 B | 6/2014 |

(Continued)

OTHER PUBLICATIONS

Office Action dated May 25, 2021 in corresponding German patent application No. 11-2019-000-057-8.

(Continued)

*Primary Examiner* — John F Mortell
(74) *Attorney, Agent, or Firm* — Knobbe, Martens, Olson & Bear, LLP

(57) ABSTRACT

This application relates to a method and a system for automatically detecting jaywalking of vulnerable road users (VRUs). In one aspect, the method includes first determining whether a detected current trajectory of the first VRU substantially matches a first path infrequently taken by the plurality of VRUs. The method also includes second determining whether a predicted trajectory of a selected VRU crosses a second path frequently taken by a plurality of vehicles based on the past trajectory data of the plurality of vehicles. The method further includes third determining whether the predicted trajectory of the selected VRU is substantially distal to a third path marked for VRU use. The method further includes determining whether the selected VRU is jaywalking based on the first determining, the second determining, and the third determining.

20 Claims, 11 Drawing Sheets

(51) Int. Cl.
*H04W 4/029* (2018.01)
*G08G 1/16* (2006.01)
*H04W 4/02* (2018.01)

(56) References Cited

U.S. PATENT DOCUMENTS

| | | | |
|---|---|---|---|
| 2009/0040054 A1 | 2/2009 | Wang et al. | |
| 2011/0246156 A1 | 10/2011 | Zecha et al. | |
| 2015/0035685 A1 | 2/2015 | Strickland et al. | |
| 2015/0084791 A1 | 3/2015 | Jang | |
| 2017/0188391 A1 | 6/2017 | Rajagopal et al. | |
| 2017/0285585 A1 | 10/2017 | Weast et al. | |
| 2017/0332340 A1 | 11/2017 | Noh et al. | |
| 2019/0152490 A1* | 5/2019 | Lan | B60W 30/0956 |
| 2020/0156538 A1* | 5/2020 | Harper | B60Q 5/006 |
| 2020/0307563 A1* | 10/2020 | Ghafarianzadeh | B60W 60/00274 |
| 2021/0114514 A1* | 4/2021 | Karol | B60Q 5/006 |

FOREIGN PATENT DOCUMENTS

| | | |
|---|---|---|
| CN | 106882143 | 6/2017 |
| CN | 106997689 | 8/2017 |
| CN | 107731009 | 2/2018 |
| CN | 107798916 | 3/2018 |
| DE | 10 2014 110 958 A1 | 4/2015 |
| JP | 2005-352577 | 12/2005 |
| JP | 2012-048537 | 3/2012 |
| JP | 2015-207129 | 11/2015 |
| JP | 2016-177722 | 10/2016 |
| JP | 2017-027599 | 2/2017 |
| KR | 10-2014-0103983 | 8/2014 |
| KR | 2016-0087277 | 7/2016 |
| KR | 2016-0147559 | 12/2016 |
| KR | 10-2017-0025179 | 3/2017 |
| WO | WO 2017/111139 | 6/2017 |
| WO | WO 2017/135998 | 8/2017 |
| WO | WO 2019/213763 | 11/2019 |

OTHER PUBLICATIONS

Lee, Namhoon, et al. "Desire: Distant future prediction in dynamic scenes with interacting agents." *Proceedings of the IEEE Conference on Computer Vision and Pattern Recognition*. 2017 pp. 2165-2174.

International Search Report and the Written Opinion, PCT/CA2019/050613, dated Jul. 18, 2019.

International Search Report and the Written Opinion, PCT/US2021/016442, dated May 4, 2021.

* cited by examiner

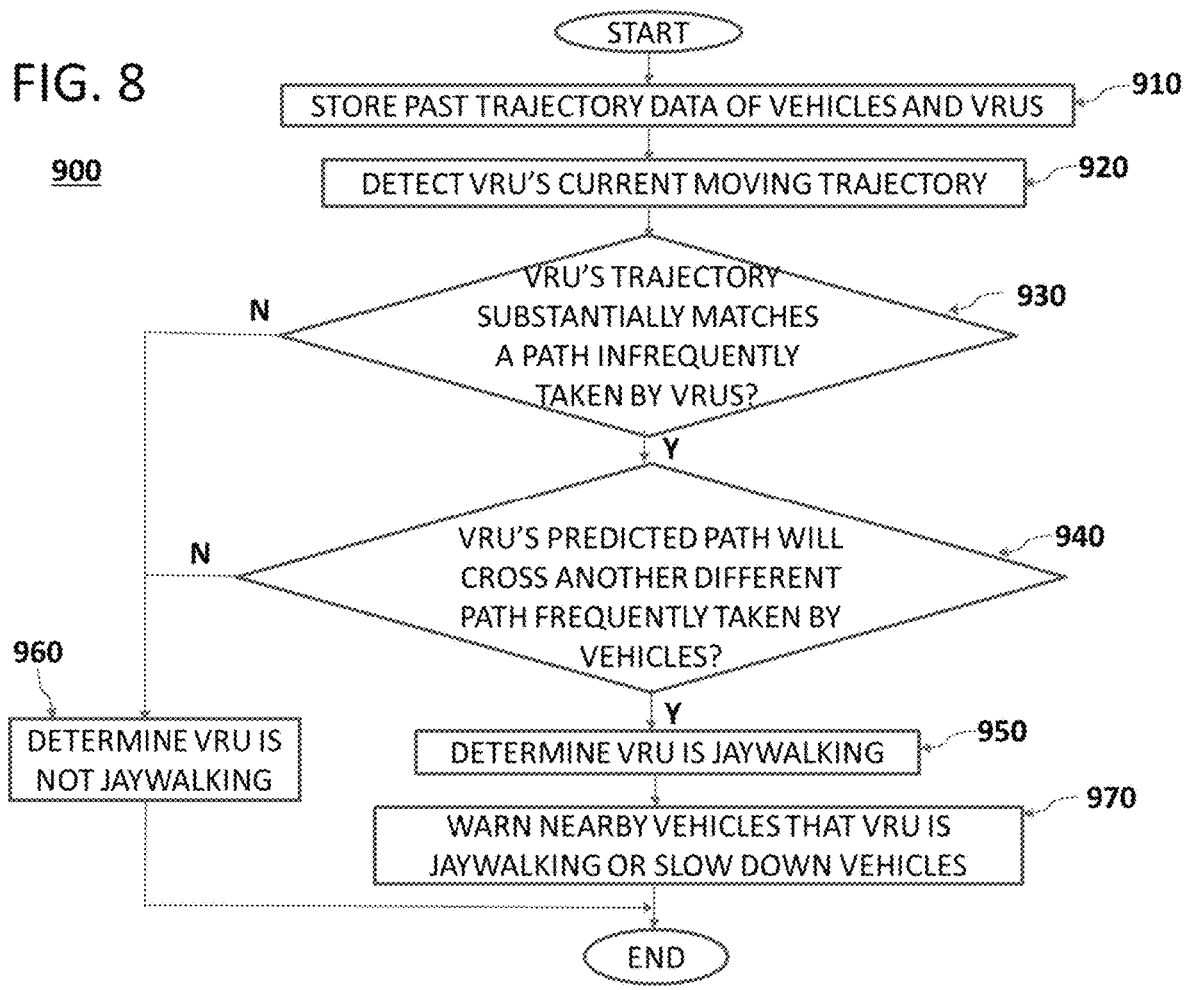

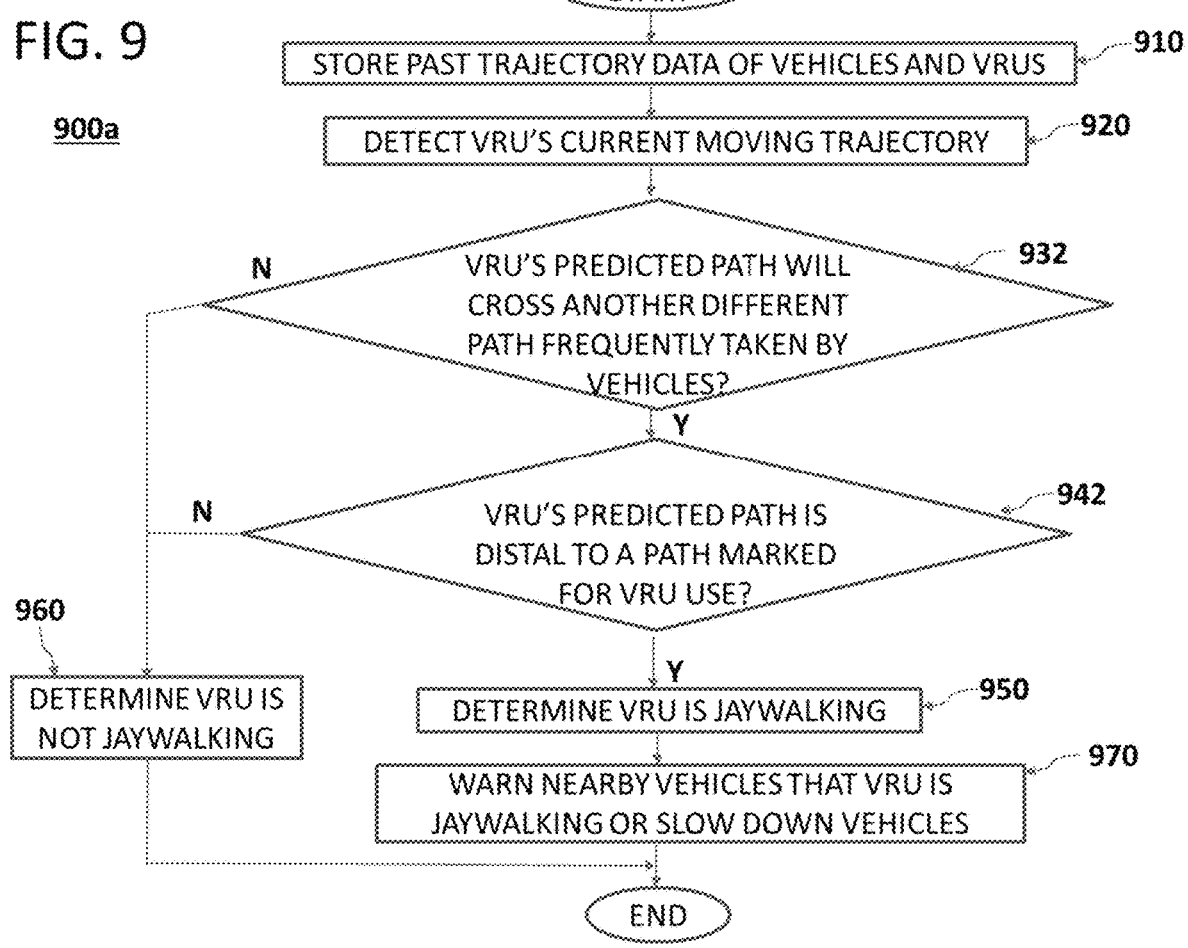

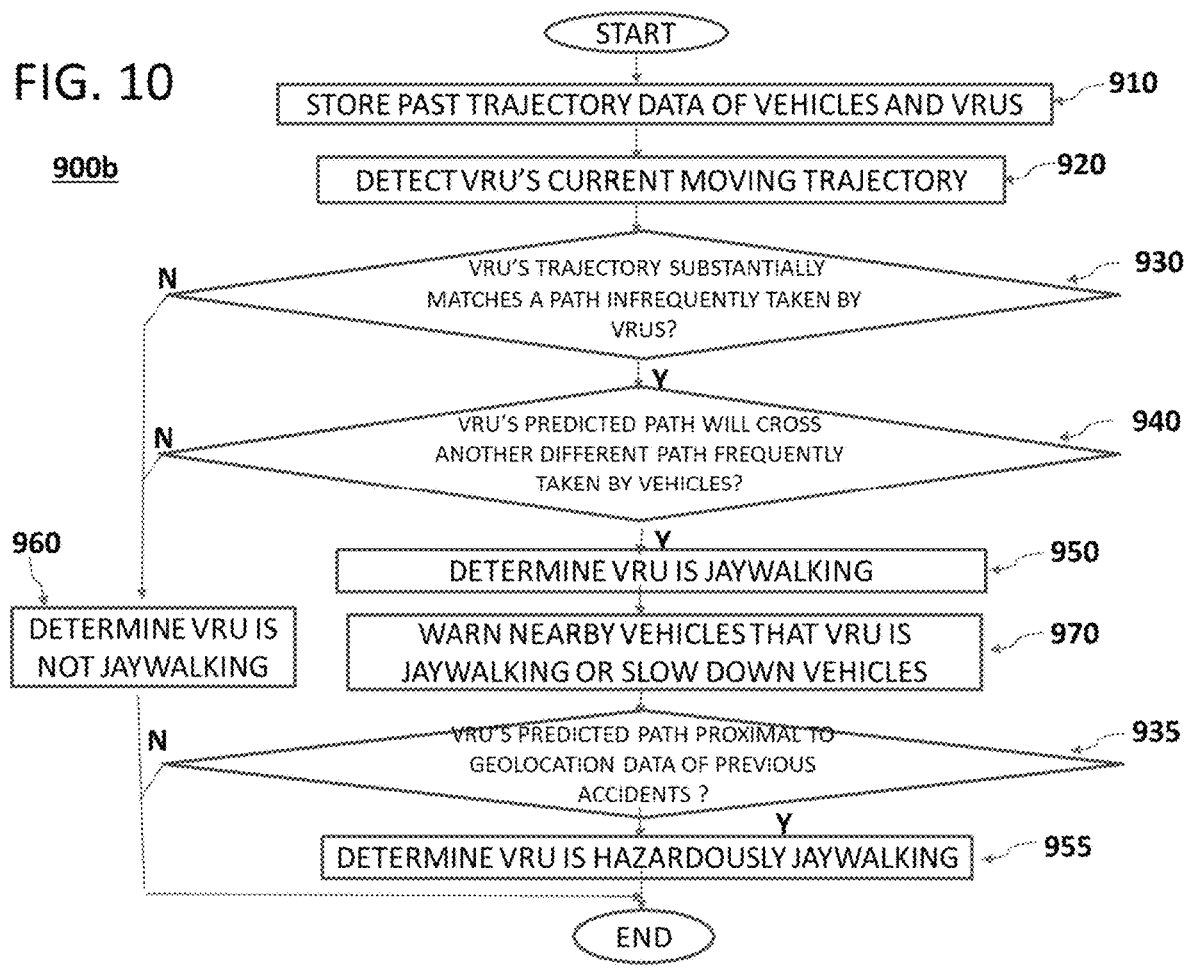

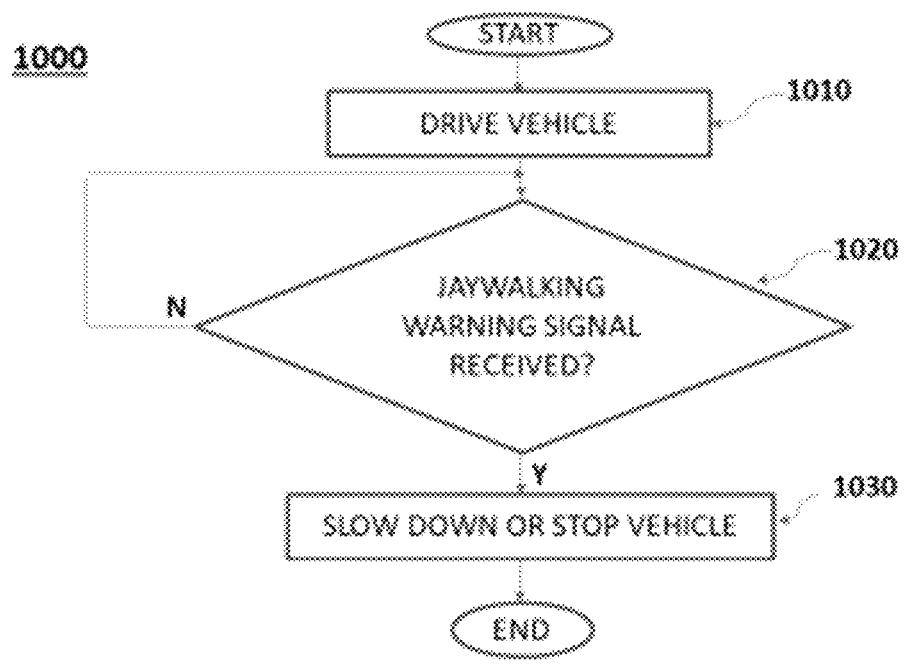

METHOD AND SYSTEM FOR DETECTING JAYWALKING OF VULNERABLE ROAD USERS

RELATED APPLICATIONS

This application claims priority to and the benefit of Provisional Application Nos. 63/005,659 filed on Apr. 6, 2020 and 63/129,356 filed on Dec. 22, 2020 in the U.S. Patent and Trademark Office, the entire contents of each of which are incorporated herein by reference.

BACKGROUND

Technical Field

The described technology generally relates to the field of road safety. More specifically, the described technology relates to a method and system for detecting jaywalking of vulnerable road users (VRUs) such as pedestrians, people in wheelchairs or scooters, bicyclists, motorcyclists.

Description of the Related Technology

Jaywalking generally refers to the act of a pedestrian walking in or crossing a roadway that has traffic, other than at a suitable crossing point. Jaywalking may be intentional and, by doing so, may be in disregard of traffic rules. In such circumstances, intentional jaywalking may involve a set of moral rules and moral conflict resolution choices wherein obeying traffic laws is weighted with a lesser priority than the freedom to act. Also, jaywalking may be non-intentional, or forced by the events, and, by doing so, may resolve a conflicting issue in order to avoid an obstacle or a danger by taking a path other than at a suitable crossing point. In such circumstances, non-intentional jaywalking may involve a set of moral rules and moral conflict resolution choices wherein obeying traffic laws is weighted with a lesser priority than minimizing risks to persons or property. Being intentional or not, this type of roadway behavior can put both the pedestrian and passengers of nearby vehicles in danger, as the vehicles may not properly or timely detect the jaywalking pedestrian. Jaywalking can also potentially place other pedestrians in danger, for example, if nearby vehicles swerve to avoid the jaywalker.

Various attempts to improve the convenience and safety of vulnerable road users (VRUs) have been made by static systems (such as pedestrian crosswalk markings, flashing traffic panels, etc.), or by dynamic systems (such as sensors for detecting pedestrians and assigning warning messages to traffic controllers, etc.), or by mobile systems (such as mobile communication systems to locate and track traffic violators as judged by the motion trail of the mobile terminal, etc.). US Patent Application 2015/0084791 A1 (entitled 'APPARATUS AND METHOD FOR MANAGING SAFETY OF PEDESTRIAN AT CROSSWALK') discloses a static system technology for managing the safety of a pedestrian at a crosswalk, which determines the location of a pedestrian in a crosswalk area, and then selectively provides a pedestrian signal extension service, an approaching vehicle notification service, and a pedestrian danger notification service for respective dangerous situations of a pedestrian in connection with the time of a pedestrian signal. However, in this disclosure, no detection units are provided for detecting jaywalkers distant from the pedestrian crosswalk area, and no predicted trajectories are provided to let VRUs and vehicles sufficient lead time to react.

US Patent Application 2017/0285585 A1 (entitled 'TECHNOLOGIES FOR RESOLVING MORAL CONFLICTS DURING AUTONOMOUS OPERATION OF A MACHINE') discloses a mobile system technology relating to a compute system configured to detect a moral conflict related to the operation of a machine, such as an autonomous vehicle, and determine operational choices for operation of the machine to resolve the moral conflict pertaining to the safety of VRUs. However, in this disclosure, no detection units are provided for detecting jaywalkers, especially jaywalkers not readily detectable by lidar, radar or video systems integrated within automated driving systems (ADS) technology, and no predicted trajectories are provided to let VRUs and vehicles sufficient lead time to react.

Chinese publication CN102682594B (entitled 'Method and system for monitoring pedestrian violation based on mobile communication') discloses a mobile system technology relating to a mobile communication systems to locate and track traffic violators as judged by the motion trail of the mobile terminal, wherein the mobile communication system is being utilized to manage or punish violators. However, jaywalking laws vary widely by jurisdiction and the fault/no fault ascertainment provided by this disclosure cannot be made within other regulatory frameworks especially since the global system for mobile communications (GSM)/code-division multiple access (CDMA)/long-term evolution (LTE) mobile terminal triangulation tracking technique does not have sufficient spatial resolution in most sub-urban areas as to ascertain jaywalking detection, and is of no legal use as to ascertain traffic law violation by a specific person. Also, no predicted trajectories are provided to let VRUs and vehicles sufficient lead time to react.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for jaywalking detection.

One inventive aspect is a method of automatically detecting jaywalking of a vulnerable road user (VRU), the method comprising: storing, at a memory, past trajectory data of a plurality of vehicles and a plurality of VRUs; detecting, at a computing device, a current moving trajectory of a VRU; first determining, at the computing device, whether the detected moving trajectory of the VRU substantially matches a first path infrequently taken by at least one of the plurality of VRUs based on the past trajectory data of the plurality of VRUs; obtaining, at the computing device, a predicted path of the VRU; second determining, at the computing device, whether the predicted path of the VRU crosses a second path frequently taken by at least one of the plurality of vehicles based on the past trajectory data of the plurality of vehicles; and third determining, at the computing device, whether or not the VRU is jaywalking based on the first determining and the second determining.

Another aspect is a system for automatically detecting jaywalking of a vulnerable road user (VRU), the method comprising: a memory configured to store past trajectory data of a plurality of vehicles and a plurality of VRUs; and a processor in data communication with the memory and configured to: detect a current moving trajectory of a VRU; first determine whether the detected moving trajectory of the VRU substantially matches a first path infrequently taken by at least one of the plurality of VRUs based on the past trajectory data of the plurality of VRUs; obtain a predicted path of the VRU; second determine whether the predicted path of the VRU crosses a second path frequently taken by at least one of the plurality of vehicles based on the past trajectory data of the vehicles; and third determine whether or not the VRU is jaywalking based on the first determining and the second determining.

Another aspect is a method of automatically detecting jaywalking of a vulnerable road user (VRU), the method comprising: detecting, at a processor, a current moving trajectory of a VRU; first determining, at the processor, whether the detected moving trajectory of the VRU substantially matches a first path infrequently taken by one or more of a plurality of VRUs based on past trajectory data of the plurality of VRUs; obtaining, at the processor, a predicted path of the VRU; second determining, at the processor, whether the predicted path of the VRU crosses a second path frequently taken by one or more of a plurality of vehicles based on past trajectory data of the plurality of vehicles; and third determining, at the processor, whether or not the VRU is jaywalking based on the first determining and the second determining.

Another aspect is a system for automatically detecting jaywalking of a vulnerable road user (VRU), the method comprising: a memory configured to store compute-executable instructions; and a processor in data communication with the memory and configured to execute the compute-executable instructions to: detect a current moving trajectory of a VRU; first determine whether the detected moving trajectory of the VRU substantially matches a first path infrequently taken by at least one of the plurality of VRUs based on the past trajectory data of the plurality of VRUs; obtain a predicted path of the VRU; second determine whether the predicted path of the VRU crosses a second path frequently taken by at least one of the plurality of vehicles based on the past trajectory data of the vehicles; and third determine whether or not the VRU is jaywalking based on the first determining and the second determining.

Another aspect is a vulnerable road user (VRU) device for automatically detecting jaywalking of a VRU, the VRU device comprising: a transceiver configured to communicate data with a nearby vehicle; and a processor configured to: detect a current moving trajectory of the VRU; first determine whether the detected moving trajectory of the VRU substantially matches a first path infrequently taken by VRUs based on the past trajectory data of the VRUs; obtain a predicted path of the VRU; second determine whether the predicted path of the VRU crosses a second path frequently taken by vehicles based on the past trajectory data of the vehicles; third determine whether or not the VRU is jaywalking based on the first determining and the second determining; and in response to the determining that the VRU is jaywalking, control the transceiver to transmit a warning signal to the nearby vehicle to slow down or stop the nearby vehicle.

Another aspect is a vehicle for automatically detecting jaywalking of a vulnerable road user (VRU), the vehicle comprising: an advanced driver assistant system (ADAS); and a processor in data communication with the ADAS and configured to: detect a current moving trajectory of the VRU; first determine whether the detected moving trajectory of the VRU substantially matches a first path infrequently taken by VRUs based on the past trajectory data of the VRUs; obtain a predicted path of the VRU; second determine whether the predicted path of the VRU crosses a second path frequently taken by vehicles based on the past trajectory data of the vehicles; third determine whether or not the VRU is jaywalking based on the first determining and the second determining; and in response to the determining that the VRU is jaywalking, control the ADAS to slow down or stop the vehicle.

Another aspect is a non-transitory computer readable medium comprising computer-executable instructions, when executed, configured to cause a processor to perform a method of automatically detecting jaywalking of a vulnerable road user (VRU), the method comprising: detecting a current moving trajectory of a VRU; first determining whether the detected moving trajectory of the VRU substantially matches a first path infrequently taken by one or more of a plurality of VRUs based on past trajectory data of the plurality of VRUs; obtaining a predicted path of the VRU; second determining whether the predicted path of the VRU crosses a second path frequently taken by one or more of a plurality of vehicles based on past trajectory data of the plurality of vehicles; and third determining whether or not the VRU is jaywalking based on the first determining and the second determining.

Still another inventive aspect of the present disclosure is a method of automatically detecting jaywalking of a vulnerable road user (VRU) may comprise: linking, to a plurality of VRUs, LTE-capable user equipment (UE) terminals having an international mobile subscriber identity (IMSI); and linking, to a plurality of vehicles, LTE-capable UE terminals having an IMSI and storing, at a memory, past trajectory data of the plurality of vehicles and the plurality of VRUs; and detecting, at a computing device, the current trajectory of any one of the plurality of VRUs; and first determining, at the computing device, whether the detected current trajectory of any one of the plurality of VRUs substantially matches a first path infrequently taken by the plurality of VRUs based on the past trajectory data of the plurality of VRUs; and if first determining is positive, then tagging, at the computing device, such VRUs as a selected VRU; and obtaining, at the computing device, a predicted trajectory of the selected VRU; and second determining, at the computing device, whether the predicted trajectory of the selected VRU crosses a second path frequently taken by the plurality of vehicles based on the past trajectory data of the plurality of vehicles, the second path different from the first path; and third determining, at the computing device, whether the predicted trajectory of the selected VRU is substantially distal to a third path marked for VRU use; and fourth determining, at the computing device, whether the selected VRU is jaywalking based on the first determining, the second determining and the third determining.

Another inventive aspect of the present disclosure is a system for automatically detecting jaywalking of a VRU, the system comprising: a plurality of LTE-capable UE terminals linked to a plurality of VRUs; and a plurality of LTE-capable UE terminals linked to a plurality of vehicles; and a memory device embedded in each of the UE terminals configured to store past trajectory data; and a sensors device embedded in each of the UE terminals configured to measure position, speed, acceleration, gyroscopic data, or a combination thereof; and a wireless communications device embedded in each of the UE terminals configured to send and receive data; and a processor device embedded in each of the UE terminals comprising a computing device configured to: detect a current trajectory of any one of the plurality of VRUs; and to first determine whether the detected current trajectory of any one of the plurality of VRUs substantially matches a first path infrequently taken by the plurality of VRUs based on the past trajectory data of the plurality of VRUs; and if first determining is positive tag as a selected VRU; and to obtain a predicted trajectory of the selected VRU; and to second determine whether the predicted trajectory of the selected VRU crosses a second path frequently taken by the plurality of vehicles, the second path different from the first path; and to third determine whether the predicted trajectory of the selected VRU is substantially distal to a third path marked for VRU use; and to fourth determine whether a VRU is jaywalking based on the first determining, the second determining and the third determining.

Yet another inventive aspect is a method of automatically detecting jaywalking of a vulnerable road user (VRU), the method comprising: storing, at a memory, past trajectory data of a plurality of vehicles and a plurality of VRUs, wherein each of the plurality of VRUs and each of the plurality of vehicles are linked to a long-term evolution (LTE)-capable user equipment (UE) terminal having an international mobile subscriber identity (IMSI); detecting, at a computing device, a current trajectory of a first one of the plurality of VRUs; first determining, at the computing device, whether the detected current trajectory of the first VRU substantially matches a first path infrequently taken by the plurality of VRUs based on the past trajectory data of the plurality of VRUs; in response to the detected current trajectory of the first VRU substantially matching the first path, tagging, at the computing device, the first VRU as a selected VRU; obtaining, at the computing device, a predicted trajectory of the selected VRU; second determining, at the computing device, whether the predicted trajectory of the selected VRU crosses a second path frequently taken by the plurality of vehicles based on the past trajectory data of the plurality of vehicles, the second path being different from the first path; third determining, at the computing device, whether the predicted trajectory of the selected VRU is substantially distal to a third path marked for VRU use; and fourth determining, at the computing device, whether the selected VRU is jaywalking based on one or more of the first determining, the second determining, and the third determining.

In some embodiments, the fourth determining includes a set of rules that take into account the plurality of VRUs' and the plurality of vehicles' past, current, and predicted trajectories, wherein the set of rules is based on a mathematical relationship between the plurality of VRUs' and the plurality of vehicles' past, current, and predicted trajectories, and wherein the trajectories comprise position data, speed data, acceleration data, gyroscopy data, or a combination thereof.

In some embodiments, the fourth determining comprises determining that the selected VRU is jaywalking when the detected current trajectory of the selected VRU substantially matches the first path, and when the predicted trajectory of the selected VRU substantially crosses the second path.

In some embodiments, the fourth determining comprises determining that the selected VRU is jaywalking when the predicted trajectory of the selected VRU substantially crosses the second path, and when the predicted trajectory of the selected VRU is substantially distal to the third path.

In some embodiments, the fourth determining comprises determining that the selected VRU is jaywalking when the detected current trajectory of the selected VRU substantially matches the first path, when the predicted trajectory of the selected VRU substantially crosses the second path, and when the predicted trajectory of the selected VRU is substantially distal to the third path.

In some embodiments, the first determining further comprises determining, at the computing device, whether the detected current trajectory of the selected VRU includes an excess signal in speed, acceleration, gyroscopy, or a combination thereof.

In some embodiments, the method further comprising, in response to the determining that the selected VRU is jaywalking, setting a danger notification pertaining to road usage safety.

In some embodiments, the danger notification includes: an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof.

In some embodiments, the method further comprises: transmitting the danger notification to the UE terminal of the selected VRU, the UE terminal of a nearby vehicle, an advanced driver assistant system of the nearby vehicle, a communications network infrastructure, a road traffic infrastructure, a pedestrian crosswalk infrastructure, a computer server, an edge computing device, an Internet of things (IoT) device, a fog computing device, a cloud computing device, any information terminal pertaining to the field of road safety, or to a combination thereof.

In some embodiments, the method further comprises detecting, at the computing device, the current trajectories of vehicles proximal to the current trajectory of the selected VRU.

In some embodiments, the fourth determining further comprises determining that the selected VRU is non-intentionally jaywalking when the detected trajectory of the selected VRU substantially matches the first path, when the predicted trajectory of the selected VRU substantially crosses the second path, and when the detected current trajectories of vehicles substantially match the third path.

In some embodiments, the third path includes a pedestrian crosswalk, a sidewalk, a bicycle lane, a motorcycle lane, a xing, a wheelchair lane, any path marked for VRU use, or any path marked for non-vehicular use.

In some embodiments, the computing device is integrated to the UE terminal of the selected VRU, the UE terminal of a nearby vehicle, an advanced driver assistant system of the nearby vehicle, a communications network infrastructure, a road traffic infrastructure, a pedestrian crosswalk infrastructure, a computer server, an edge computing device, an Internet of things (IoT) device, a fog computing device, a cloud computing device, or any information terminal pertaining to the field of road safety.

In some embodiments, the method further comprises storing, at the memory, past geolocation information data of accidents involving the plurality of vehicles and the plurality of VRUs.

In some embodiments, the fourth determining further comprises determining that the selected VRU is hazardously jaywalking when the predicted trajectory of the selected VRU is substantially proximal to the past geolocation information data of accidents involving the plurality of vehicles and the plurality of VRUs.

In some embodiments, the fourth determining further comprises determining that the selected VRU is hazardously jaywalking when the predicted trajectory of the selected VRU substantially crosses the second path, and when the second path has an average speed of more than about 50 km/h.

Still yet another aspect is a system for automatically detecting jaywalking of a vulnerable road user (VRU), the system comprising: a memory device configured to store past trajectory data of a plurality of vehicles and a plurality of VRUs; a processor device comprising a computing device configured to: detect a current trajectory of a first one of the plurality of VRUs, each of the plurality of VRUs and each of the plurality of vehicles configured to be linked to a long-term evolution (LTE)-capable user equipment (UE) terminal; first determine whether the detected current trajectory of the first VRU substantially matches a first path infrequently taken by the plurality of VRUs based on the past trajectory data of the plurality of VRUs; in response to the detected current trajectory of the first VRU substantially matching the first path, tag the first VRU as a selected VRU; obtain a predicted trajectory of the selected VRU; second determine whether the predicted trajectory of the selected VRU crosses a second path frequently taken by the plurality of vehicles, the second path different from the first path; third determine whether the predicted trajectory of the selected VRU is substantially distal to a third path marked for VRU use; and fourth determine whether the selected VRU is jaywalking based on one or more of the first determining, the second determining, and the third determining.

In some embodiments, the computing device comprises computer-executable instructions configured to automatically detect jaywalking of the selected VRU.

In some embodiments, the computer-executable instructions include a software code, a firmware code, a hardware code, or any combination of computational codes.

In some embodiments, the computing device is configured to determine that the selected VRU is jaywalking when the detected current trajectory of the selected VRU substantially matches the first path, and when the predicted trajectory of the selected VRU substantially crosses the second path.

In some embodiments, the computing device is configured to determine that the selected VRU is jaywalking when the predicted trajectory of the selected VRU substantially crosses the second path, and when the predicted trajectory of the selected VRU is substantially distal to the third path.

In some embodiments, the computing device is configured to determine that the selected VRU is jaywalking when the detected current trajectory of the selected VRU substantially matches the first path, when the predicted trajectory of the selected VRU crosses the second path, and when the predicted trajectory of the selected VRU is substantially distal to the third path.

In some embodiments, the computing device is configured to provide a danger notification pertaining to road usage safety in response to the determining that the selected VRU is jaywalking.

In some embodiments, the danger notification includes an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof.

In some embodiments, the computing device is further configured to detect future trajectories of a subset of the plurality of vehicles which are proximal to the current trajectory of the selected VRU.

In some embodiments, the system further comprises a wireless communications device configured to transmit the danger notification to the UE terminal of the selected VRU, the UE terminal of one of the plurality of vehicles proximal to the selected VRU, an advanced driver assistant system of one of the vehicles proximal to the selected VRU, a communications network infrastructure, a road traffic infrastructure proximal to the selected VRU, a pedestrian crosswalk infrastructure proximal to the selected VRU, a computer server, an edge computing device, an Internet of things (IoT) device, a fog computing device, a cloud computing device, any information terminal pertaining to the field of road safety, or to a combination thereof.

In some embodiments, the third path includes a pedestrian crosswalk, a sidewalk, a bicycle lane, a motorcycle lane, a xing, a wheelchair lane, any path marked for VRU use, or any path marked for non-vehicular use.

In another aspect, there is provided a non-transitory computer readable medium comprising computer-executable instructions, when executed, configured to cause a processor to perform a method of automatically detecting jaywalking of a vulnerable road user (VRU), the method comprising: storing, at a memory, past trajectory data of a plurality of vehicles and a plurality of VRUs, wherein each of the plurality of VRUs and each of the plurality of vehicles are linked to a long-term evolution (LTE)-capable user equipment (UE) terminal having an international mobile subscriber identity (IMSI); detecting, at a computing device, a current trajectory of a first one of the plurality of VRUs; first determining, at the computing device, whether the detected current trajectory of the first VRU substantially matches a first path infrequently taken by the plurality of VRUs based on the past trajectory data of the plurality of VRUs; in response to the detected current trajectory of the first VRU substantially matching the first path, tagging, at the computing device, the first VRU as a selected VRU; obtaining, at the computing device, a predicted trajectory of the selected VRU; second determining, at the computing device, whether the predicted trajectory of the selected VRU crosses a second path frequently taken by the plurality of vehicles based on the past trajectory data of the plurality of vehicles, the second path being different from the first path; third determining, at the computing device, whether the predicted trajectory of the selected VRU is substantially distal to a third path marked for VRU use; and fourth determining, at the computing device, whether the selected VRU is jaywalking based on one or more of the first determining, the second determining, and the third determining.

Any of the features of an aspect is applicable to all aspects identified herein. Moreover, any of the features of an aspect is independently combinable, partly, or wholly with other aspects described herein in any way, e.g., one, two, or three or more aspects may be combinable in whole or in part. Further, any of the features of an aspect may be made optional to other aspects. Any aspect of a method can comprise another aspect of a system for automatically detecting jaywalking of a vulnerable road user (VRU), and any aspect of a system for automatically detecting jaywalking of a vulnerable road user (VRU) can be configured to perform a method of another aspect. Furthermore, any aspect of a method can comprise another aspect of at least one of a cloud, a server, an infrastructure device, a vehicle, a VRU terminal or a vehicle terminal, and any aspect of a cloud, a server, an infrastructure device, a vehicle, a VRU terminal or a vehicle terminal can be configured to perform a method of another aspect.

BRIEF DESCRIPTION OF THE DRAWINGS

FIG. 8 is an example flowchart of a process for determining jaywalking according to an embodiment of the described technology.

FIG. 9 is an example flowchart of a process for determining jaywalking according to another embodiment of the described technology.

FIG. 10 is an example flowchart of a process for determining jaywalking according to another embodiment of the described technology.

FIG. 11 is an example flowchart of a process for preventing or mitigating collision based on determined jaywalking according to an embodiment of the described technology.

DETAILED DESCRIPTION

Figure 1:
FIG. 1 represents a street corner scenario including streets and sidewalks.
Figure 1:

"Jaywalking" is often used to describe various pedestrian offences, including crossing at an intersection against a red light or "don't walk" signal, crossing a mid-block where a crosswalk exists, and/or failing to yield to vehicles when crossing the roadway. Jaywalking laws vary widely by jurisdiction and some of these offenses may be subject to regulatory leeway. For example, state road regulations in the United States often do not prohibit a pedestrian from crossing a roadway between intersections if at least one of the two adjacent intersections is not controlled by a signal, but they stipulate that a pedestrian not at a crosswalk must yield the right of way to approaching drivers, whereas nothing shall relieve the drivers from obligation of taking all due care to minimize risks for jaywalking pedestrians. Regulations in other countries state that no pedestrian shall cross a roadway except within portions marked for pedestrian use, or within a safe distance from such markings. Therefore, the determination of this type of roadway behavior is subject to a multimodal combination that may comprise fundamental elements such as jaywalker intent, moral conflict resolution, road context, local applicable regulations, and/or leeway. Therefore, well-structured frameworks for jaywalking determination and/or detection are intrinsically difficult to harness precisely under most circumstances, as this multimodal combination encompasses hard-coded and soft-coded rules that may vary with each and every given occurrence. As a result, in most current regulatory frameworks, the provision of "faulty notifications" to jaywalkers is subject to variability and uncertainty since the fundamental elements of the jaywalking phenomenology may have both randomness and variable equilibrium point settings.

In some embodiments, as it relates to the field of road safety, jaywalking requires a provision of "danger notifications" to VRUs and to nearby approaching vehicles, wherein the danger notifications may be triggered according to a set of rules that take into account VRUs and vehicles past, current and predicted trajectories, as well as proximity threshold limits for danger avoidance between VRUs and vehicles. The usefulness of providing danger notifications relates to the field of road safety since jaywalking may be an offense in which accidents between pedestrians and vehicles occur, and human injury can be severe enough that VRUs may be injured or killed by vehicular traffic, and thus VRUs and vehicles must observe their respective traffic rules. To be useful, danger notifications relating to the field of road safety may require precautious triggering in order to let VRUs and vehicles sufficient lead time to react, such as to correct the offence, or to actively prepare to prevent the danger before an accident occurs. For most road circumstances, lead time to react may correspond to danger notifications provided to VRUs and vehicles at least about 5 seconds in advance, or more. Therefore, predicted trajectories of VRUs and vehicles may be useful in achieving such advanced notifications, wherein predictions may be based on modern signal processing of spatiotemporal trajectories including dead reckoning techniques and artificial intelligence (AI). Accordingly, various embodiments provide a method and system for automatically detecting VRUs and for setting danger notifications to the VRUs and to nearby approaching vehicles for the sake of collision avoidance, wherein the danger notifications are triggered according to a set of rules that take into account VRUs and vehicles past, current, and/or predicted trajectories.

Some embodiments provide a method and a system for automatically detecting VRUs and for setting danger notifications to the VRUs and to nearby approaching vehicles for the sake of collision avoidance with sufficient lead time to react. The usefulness of the described technology is for providing danger notifications relating to the field of road safety, and at least one inventive aspect of the described technology relates to precautious jaywalking detection using past, current, and/or predicted trajectories of VRUs.

Jaywalking generally refers to the act of a pedestrian walking in or crossing a roadway that has traffic, other than at a suitable crossing point. The term is often used to describe various pedestrian offences, including crossing at an intersection against a red light or "don't walk" signal, crossing a mid-block where a crosswalk exists, or failing to yield to vehicles when crossing the roadway. The term can also be used broadly to include VRUs, such as pedestrians, workers, wheelchair users, bicycle drivers, or any other types of non-motorized road users. As used herein, the term 'jaywalking' generally refers to any acts of walking or crossing a roadway that has vehicle traffic, other than at a suitable crossing point, or otherwise in disregard of traffic rules, wherein the act of walking or crossing a roadway is being done by a VRU. Also, as used herein, the term 'vulnerable road users', or 'VRUs', generally refers to any human being that has to be protected from road hazards. The term includes but is not limited to: non-motorized road users such as pedestrians, construction workers, emergency services workers, policemen, firefighters, bicyclists, wheelchair users, or motorized road users such as scooters, motorcyclists, or any other VRUs or persons with disabilities or reduced mobility and orientation. Also, as used herein, the term 'vehicle' generally refers to any motor propelled device that could present a road hazard for VRUs. It includes but is not limited to: cars, autonomous vehicles, non-autonomous vehicles, self-driving vehicles, off-road vehicles, trucks, manufacturing vehicles, industrial vehicles, safety & security vehicles, electric vehicles, low-altitude airplanes, helicopters, drones (UAVs), boats, or any other types of automotive, aerial, or naval vehicles with some proximity to VRUs such as encountered in urban, industrial, commercial, airport, or naval environments.

Jaywalking, when detected early, can alert and inform vehicle drivers and save lives. At least one advantage of the described technology relates to providing jaywalking danger notifications relating to the field of road safety, and pertaining to collision avoidance between VRUs and vehicles, before accidents happen. One aspect of the described technology relates to precautious jaywalking detection and notifications using past, current, and/or predicted trajectories of VRUs and vehicles, based on an AI algorithm distributed among edge and cloud systems.

The current spatiotemporal positioning of a VRU may be determined from LTE cellular radio signals mediated by cellular base stations (BS) and a location service client (LCS) server. Most LTE-capable mobile terminals have an international mobile subscriber identity (IMSI), a number that uniquely identifies every user of a cellular network. Signals from at least three cellular BSs may be used to determine by triangulation the position of a VRU if an LTE-capable mobile terminal is physically linked to the VRU, such as a mobile phone inserted in the pocket of the VRU or held by the VRU, attached to the dashboard of a nearby vehicle, or disposed somewhere inside the vehicle. Also, the current spatiotemporal positioning of a VRU may be determined from other types of sensors including, for example, any one of global positioning system (GPS) sensors, or global navigation satellite systems (GNSS) sensors, or micro-electromechanical system (MEMS) accelerometer sensors, of MEMS gyroscope sensors, embedded in the mobile terminal of the VRU. Also, the current spatiotemporal positioning of a VRU may be determined from the interoperability of several different positioning sensors, wherein the current spatiotemporal positioning data may be obtained using a combination of different sensors, or obtained by switching from one sensor to another, depending on the signal strength and/or signal availability at a given position. As used herein, the term "interoperability" generally refers to the capability of different sensors embedded within the same terminal to work at the same time, to exchange data with a processor via a common set of exchange formats and file formats, and/or to use the same protocols. For example, GPS signal strength may be unavailable in dense urban areas, whereas LTE signal may be used for spatiotemporal positioning in such circumstances. Also, for example, LTE signal strength may be unavailable in rural areas, whereas GPS signal may be used for spatiotemporal positioning in such circumstances. Also, for example, if GPS- or LTE-signals are unavailable (within road tunnels for example), other sensors having speed, accelerometry and/or gyroscopic sensing capabilities may be used to complement spatiotemporal positioning information in such circumstances. Therefore, at least one of the methods for jaywalking determination described herein may advantageously use sensor interoperability within the mobile terminal of the VRU in order to maximize spatiotemporal data acquisition under various circumstances.

However, obtaining a precise measure of the spatiotemporal trajectory can be very challenging if using only current spatiotemporal positioning data, as the spatiotemporal positioning offered by GPS- or LTE-capable terminals may be highly inaccurate. The GSM/CDMA/LTE mobile terminal triangulation tracking technique does not have sufficient spatial resolution in most sub-urban areas as to ascertain spatiotemporal positioning within tens of meters accuracy. LTE using 5G NR new radio access technology (RAT) developed by 3GPP for 5G mobile networks may improve mobile terminal triangulation tracking techniques within a few meters accuracy. As for GPS/GNSS sensors embedded in mobile terminals, spatiotemporal positioning inaccuracies may be 5 meters or more, which may not be accurate enough to positively ascertain the occurrence of jaywalking for a VRU. Furthermore, the techniques of map-matching VRUs and vehicles onto digital road maps may not be accurate enough to positively ascertain the occurrence of jaywalking or the collision probability since road maps often do not include precise path widths, crossing walk locations, and/or updates of paths marked for VRU exclusive use. As a result, using only current spatiotemporal positioning data, or simply matching the current spatiotemporal positioning to road maps, may yield inaccurate results, meaning a high occurrence of false positives and/or false negatives for the determination of jaywalking.

The spatiotemporal positioning accuracy of GPS- and/or LTE-capable terminals may be improved by taking into account past and current spatiotemporal positioning data points and by signal processing of the data points, wherein signal processing is being performed by signal filtering techniques such as the Kalman filter, dead reckoning techniques, AI techniques, and/or other signal processing techniques, that average past and current spatiotemporal data points using specific models in order to reduce data noise. Road maps inaccuracies may be improved by storing past spatiotemporal trajectory data of vehicles and VRUs in order to determine their respective likely road usage paths based on statistical techniques.

The predicted spatiotemporal positioning of a VRU may be determined from modern signal processing techniques applied to past and current spatiotemporal data points of a VRU, including dead reckoning techniques and AI techniques. Past and current speed, acceleration and direction data points may also be used, in addition to spatiotemporal position data points, in order to enhance prediction accuracy and reliability. Therefore, in addition to GPS- and/or LTE-capable terminals, other terminals having speed, accelerometry, and gyroscopic sensing capabilities may be useful. As used herein, the term 'user equipment (UE) terminal' generally refers to any mobile terminal based on smartphones or mobile tablets, that provides wireless telephony (e.g., LTE) communications capabilities, as well as local area network (LAN) wireless communications capabilities (e.g., wireless communications configured to IEEE 802.11 standards, e.g., WiFi), and as well as wireless personal area network (WPAN) capabilities (e.g., wireless communications configured to IEEE 802.15 standards, e.g., Bluetooth), including the user interface for setting these capabilities.

The signal processing techniques may be embedded in UE terminals specific to terminals physically linked to vehicles, or to terminals physically linked to VRUs. For example, the UE terminals physically linked to vehicles or to VRUs, such as a mobile phone inserted in the pocket of the VRU or held by the VRU, attached to the dashboard of the vehicle or disposed somewhere inside the vehicle, may comprise a computational unit or processor (hardware, or firmware, or software) for processing past and current spatiotemporal data points, the computational unit being: a mobile application, a software, a firmware, a hardware, a physical device, a computing device, or a combination thereof. The embedded signal processing techniques (e.g., Kalman, dead reckoning, and/or AI algorithms) may use different algorithmic codes in order to provide specific results for different UE terminals, or to provide specific results for different end users, who may be related to the automobile sector, the cell phone sector, the telecommunications sector, the transportation sector, and/or any other sectors. End users may include automobile OEMs, cell phone applications providers, mobile telephony providers, and/or any other end users.

With the dead reckoning technique, the process of predicting spatiotemporal positioning includes calculating VRU's future position by using past and current positions, as well as estimations of speed, acceleration, and/or direction over elapsed time. The dead reckoning technique may use a Kalman filter based on Newton's laws of motion, wherein the filtering is based on position, speed, acceleration, and/or direction data. With such technique, the position and speed are described by the linear state space $X_k=\{X\ dX/dt\}'$, where $dX/dt$ is the speed, that is, the derivative of the three-dimensional position $X=f(x,y,z)$ with respect to time. The technique may assume that between the (k−1) and k timestep uncontrolled forces cause a constant acceleration of $a_k$ that is normally distributed, with mean 0 and standard deviation $\sigma_a$. From Newton's laws of motion it may be concluded that $X_k=F\ X_{k-1}+G\ a_k$, where $F=\{1\ \Delta t,\ 0\ 1\}$ and $G=\{\Delta t^2/2\ \Delta t^2\}'$.

With the AI technique, the process of predicting spatiotemporal positioning can include embedding a recurrent neural network (RNN) algorithm, or a reinforcement learning (RL) algorithm, or a conditional random fields (CRFs) algorithm, or a machine learning (ML) algorithm, or a deep learning (DL) algorithm, or any other AI algorithm, or a combination thereof. RNN is an artificial neural network algorithm where connections between nodes form a directed graph along a temporal sequence, this allows the neural network to have temporal dynamic behavior in which the spatiotemporal coordinates of a VRU is denoted by a matrix $X=(x,y,z,t)$. RL is an area of ML concerned with how participants ought to take actions in an environment so as to maximize some notion of cumulative reward. CRF is a class of statistical modeling method often applied in pattern recognition and ML and used for structured prediction.

In some embodiments, the AI technique may be used to predict the likely trajectory of a VRU based on small spatiotemporal data sets as well as large spatiotemporal data sets. A spatiotemporal trajectory model may be defined as a set of spatiotemporal points $X=(x,y,z,t)$ of a participant moving along a trajectory represented by its geolocation coordinates in space and time (sequential datasets of participant, time and location). The data sets may also be spatiotemporal geolocation data that may comprise other types of data not classified as spatiotemporal points, such as speed data, acceleration data, direction data, and/or other types of data. In order to process sequential datasets, neural networks of DL (e.g., RNN) algorithms may be used. RNNs have been developed mostly to address sequential or time-series problems such as sensor's stream data sets of various length. Also, long short term memory (LSTM) algorithms may be used, which mimic the memory to address the shortcomings of RNN due to the vanishing gradient problems, preventing the weight (of a given variable input) from changing its value. RNN is an artificial neural network with hidden layer $h_t$, referring to a recurrent state and representing a "memory" of the network through time. The RNN algorithm may use its "memory" to process sequences of inputs $x_t$. At each time step t, the recurrent state updates itself using the input variables $x_t$ and its recurrent state at the previous time step $h_{t-1}$, in the form: $h_t=f(x_t,h_{t-1})$. The function $f(xt,ht-1)$ in turn is equal to $g(W\psi(x_t)+Uh_{t-1}+bh)$, where $\psi(xt)$ is the function which transforms a discrete variable into a continuous representation, while W and U are shared parameters (matrices) of the model through all time steps that encode how much importance is given to the current datum and to the previous recurrent state. Variable b is a bias, if any. Whereas neural networks of DL models require large data sets to learn and predict the trajectory of a participant, CRFs may be used for the same purpose for smaller data sets. CRFs may be better suited for small datasets and may be used in combination with RNN. Models with small datasets may use RL algorithms when trajectory predictions consider only nearest spatiotemporal geolocation data.

In some embodiments, the AI technique may be used to predict a likely trajectory of a VRU based on expanded spatiotemporal data sets and other type of data sets, which may relate to the trajectory intent of a vehicle or a VRU, including spatiotemporal velocity and acceleration data sets that determine spatiotemporal change of position ($dx/dt$, $dy/dt$, $dz/dt$, $d^2x/dt^2$, $d^2y/dt^2$, $d^2z/dt^2$), spatiotemporal angular, or gyroscopic, data sets that determine spatiotemporal orientation and change of orientation ($\theta_x$, $\theta_y$, $\theta_z$, $d\theta_x/dt$, $d\theta_y/dt$, $d\theta_z/dt$, $d^2\theta x/dt^2$, $d^2\theta_y/dt^2$, $d^2\theta_z/dt^2$), or other spatiotemporal data sets or a combination thereof. A spatiotemporal trajectory model may be defined as a set of spatiotemporal points $X=(x,\ y,\ z,\ t)$ or a set of expanded spatiotemporal points $X=(x,\ y,\ z,\ t,\ dz/dt,\ dy/dt,\ dz/dt,\ d^2x/dt^2,\ d^2y/dt^2,\ d^2z/dt^2,\ \theta_x,\ \theta_y,\ \theta_z,\ d\theta_x/dt,\ d\theta_y/dt,\ d\theta_z/dt,\ d^2\theta_x/dt^2,\ d^2\theta_y/dt^2,\ d^2\theta_z/dt^2)$ of a vehicle or a VRU moving along a trajectory represented by its geolocation, velocity, and gyroscopic coordinates in three-dimensional space and time. The RNN algorithm may use its "memory" to process sequences of inputs $X=(x,\ y,\ z,\ t,\ dz/dt,\ dy/dt,\ dz/dt,\ d^2x/dt^2,\ d^2y/dt^2,\ d^2z/dt^2,\ \theta_x,\ \theta_y,\ \theta_z,\ d\theta_x/dt,\ d\theta_y/dt,\ d\theta_z/dt,\ d^2\theta_x/dt^2,\ d^2\theta_y/dt^2,\ d^2\theta_2/dt^2)$. At each time step t, the recurrent state updates itself using the input variables $x_t$ and its recurrent state at the previous time step $h_{t-1}$, in the form: $h_t=f(x_t,h_{t-1})$.

In some embodiments, the dead reckoning technique, or the AI technique, or a combination thereof, may be used to determine the size, area, and shape of a vehicle-to-VRU proximity threshold limit, which determines a dimensional safety margin for the VRU to establish a safe distance between the VRU and a vehicle. The vehicle-to-VRU proximity threshold limit may be based on mapping zones, e.g., regions of the environment based on a level of risk probability of identified spaces. For example, spatial coordinates coincident with sidewalks may be classified as low-danger zones for VRUs. Spatial coordinates coincident with streets may be classified as high-danger zones for VRUs. Spatial coordinates coincident with parks may be considered as safe zones for VRU. Since sidewalks represent safe zones for VRUs, the proximity threshold limit for a sidewalker may be set to the size of the sidewalk itself (usually less than about 3 meters). Whereas, as streets represent dangerous zones for VRUs, the proximity threshold limit for jaywalkers may be set to a larger size (about 3 meters to about 5 meters) taking into account past, current, and/or predicted trajectories of VRU and vehicles in order to determine a dimensional safety margin for establishing a provision of danger notifications with sufficient lead time to react.

Jaywalking may refer to a pedestrian walking on a sidewalk and then crossing a roadway other than at a suitable pedestrian crosswalk zone. In this example, a sidewalk may be a path along the side of a road that accommodates moderate changes in grade or height, and separated from the vehicular section by a curb including, for example, a raised 15-centimeter step between the sidewalk and the road, and may also include a lowered gutter to channel runoff water. There may also be a median strip of vegetation, grass or bushes or trees or a combination of these either between the sidewalk and the roadway or between the sidewalk and the curb. Therefore, these raised, and/or lowered, transitions between sidewalks and roads may relate to rapid changes, or jitters, or excess signal, in velocity, acceleration or orientation data, as a VRU walks across the bumpy sidewalk-to-road boundary and enters into jaywalking. Therefore, the transition between no-jaywalking and jaywalking may be determined by analysing the occurrence of any rapid changes, or jitters, or excess signal, in velocity, acceleration or orientation data provided by the set of expanded spatiotemporal points $X=(x, y, z, t, dz/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$ of the VRU moving along a trajectory represented by its geolocation, velocity, and gyroscopic coordinates in three-dimensional space and time. More specifically, the transition between no-jaywalking and jaywalking may be determined by analysing the occurrence of any rapid changes, or the occurrence of excess signal, in velocity, acceleration or orientation from the $(dz/dt, dy/dt, dz/dt, d^2x/dt^2, d^2y/dt^2, d^2z/dt^2, d\theta_x/dt, d\theta_y/dt, d\theta_z/dt, d^2\theta_x/dt^2, d^2\theta_y/dt^2, d^2\theta_z/dt^2)$ sub-dataset of the VRU along specific spatiotemporal points $X=(x, y, z)$ corresponding to transitions between sidewalk and roadway. Therefore, before the occurrence of jaywalking, the detected current trajectory of the VRU may include excess signal in speed, acceleration, or gyroscopy (orientation), or a combination thereof, wherein 'excess signal' refers to an above-average signal detection of speed, acceleration, and/or gyroscopy.

In some embodiments, the method for processing sequences of inputs $X=(x, y, z, t, dz/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$ may advantageously use sensor interoperability within the UE terminal of a VRU in order to maximize spatiotemporal data acquisition and/or coverage under various adverse local circumstances. For example, the extended set of spatiotemporal positioning of a VRU may be determined from the interoperability of several different positioning sensors embedded within the UE terminals, wherein the spatiotemporal positioning data may be obtained using a combination of different sensors (e.g., GPS, LTE, MEMS accelerometers, MEMS gyroscopes, etc.), or obtained by switching from one sensor to another, depending on the signal strength and/or signal availability at a given spatiotemporal position. For example, GPS signal strength may be unavailable in dense urban areas, whereas LTE signal may be used for spatiotemporal positioning in such circumstances. Also, for example, LTE signal strength may be unavailable in rural areas, whereas GPS signal may be used for spatiotemporal positioning in such circumstances. Also, for example, GPS- or LTE-signals may be unavailable within road tunnels, whereas other interoperable sensors embedded within the UE terminals having speed, accelerometry and gyroscopic sensing capabilities may be used in order to complement spatiotemporal positioning data in such circumstances In some embodiments, a method of automatically detecting jaywalking of a VRU may comprise linking, to a plurality of VRU, LTE-capable UE terminals having an IMSI and linking, to a plurality of vehicles, LTE-capable UE terminals having an IMSI. The method may also include storing, at a memory, past trajectory data of the plurality of vehicles and the plurality of VRUs, and detecting, at a computing device, the current trajectory of any one of the plurality of VRUs. The method may further include first determining, at the computing device, whether the detected current trajectory of any one of the plurality of VRUs substantially matches a first path infrequently taken by the plurality of VRUs based on the past trajectory data of the plurality of VRUs and if the first determining is positive, then tagging, at the computing device, such VRUs as selected VRU. The method may further include obtaining, at the computing device, a predicted trajectory of the selected VRU. The method may further include second determining, at the computing device, whether the predicted trajectory of the selected VRU crosses a second path frequently taken by the plurality of vehicles based on the past trajectory data of the plurality of vehicles, the second path different from the first path. The method may further include third determining, at the computing device, whether the predicted trajectory of the selected VRU is substantially distal to a third path marked for VRU use. The method may further include fourth determining, at the computing device, whether the selected VRU is jaywalking based on the first determining, the second determining and the third determining. The method of automatically detecting jaywalking of a VRU may take into account past, current, and/or predicted trajectories of a plurality of vehicles and a plurality of VRUs, wherein the trajectory may comprise position, speed, acceleration, gyroscopy data, or a combination thereof.

In some embodiments, any given VRU out of the plurality of VRUs may be designated as a 'selected VRU' if any one of the first, or second, or third above-mentioned determining is detected. In such case, the algorithm embedded within the computing device may be configured to "follow more closely" the selected VRU as it may have further signs of walking away from safe zones. Also, in such case, the prospects of improving road safety may justify spending CPU capacity in calculating the predicted trajectory of the selected VRU, as well as spending LTE capacity in transmitting danger notifications to the selected VRU and to nearby vehicles. For example, if the detected current trajectory of any one of the VRUs substantially matches a first path infrequently (hereinafter to be interchangeably used with "not frequently") taken by the plurality of VRUs based on the past trajectory data of the plurality of VRUs, then such VRU may be selected as a 'selected VRU'. Also, if the predicted trajectory of any one of the VRU crosses a second path frequently taken by the plurality of vehicles based on the past trajectory data of the plurality of vehicles, then such VRU may be designated as a 'selected VRU'. Also, if the predicted trajectory of the selected VRU is substantially distal to a third path marked for VRU use, then such VRU may be designated a 'selected VRU'. In some embodiments, if the detected current trajectory of any one of the VRUs substantially matches a first path infrequently taken by the plurality of VRUs based on the past trajectory data of the plurality of VRUs, then such VRU may be designated as a 'selected VRU'. In some embodiments, if the detected current trajectory of any one of the VRUs substantially matches a first path infrequently taken by the plurality of VRUs based on the past trajectory data of the plurality of VRUs, and includes excess signal in speed, acceleration, gyroscopy, or a combination thereof, then such VRU may be designated as a 'selected VRU'. A 'selected VRU' may need to have any one of the first, second, and/or third above-mentioned determining; however, each one of these determinings taken individually may not be sufficient to determine that the selected VRU is "jaywalking" in certain embodiments. If only one of the first, second, and/or third above-mentioned determining is taken alone, then this may lead to false positives or false negatives in the determination of whether a given VRU is jaywalking. Therefore a fourth determining may be necessary for a reliable determination of whether a VRU is jaywalking.

In some embodiments, the method of automatically detecting jaywalking of a VRU may be based on a fourth determining, wherein the fourth determining may include a set of rules that take into account the VRUs' and the vehicles' past, current, and/or predicted trajectories. The set of rules may be based on a mathematical relationship between the VRUs' and the vehicles' past, current, and/or predicted trajectories. The trajectories may comprise position data, speed data, acceleration data, gyroscopy data, or a combination thereof. Specifically, the jaywalking determination (e.g., the fourth determining) may be based on an large ensemble of determinations comprising position, speed, acceleration, and/or direction moving components of a plurality of vehicles and a plurality of VRUs. Thus, the jaywalking determination may include comparing a set of past, current and/or predicted expanded spatiotemporal points $X=(x, y, z, t, dz/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$ between a selected VRU ($X_{VRUselected}$) and a plurality of VRUs ($X_{VRUplurality}$) and a plurality of vehicles ($X_{vehicle}$), moving along trajectories represented by their geolocation, velocity, and gyroscopic coordinates in three-dimensional space and time. The comparison between $X_{VRU}$ and $X_{vehicle}$ may thus involve a wide range of possible different combinations between their respective sets of past, current, and/or predicted spatiotemporal points $(x, y, z, t, dz/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$. Such range of possible different combinations may represent about $n^2(n+1)$ different combinations for jaywalking determination, or about 7000 possible different combinations if 19 spatiotemporal points are considered in the expanded spatiotemporal data sets.

According to some embodiments, the method of automatically detecting jaywalking of a VRU may comprise a set of rules based on the correlation between $X_{VRU}$ and $X_{vehicle}$, such that: $R=corr(X_{VRU}, X_{vehicle})$. In mathematics, a correlation is a numerical measure meaning a statistical relationship between two variables. Such correlation may assume values, or coefficients of correlation, in the range from $-1$ to $+1$, where $\pm 1$ indicates the strongest possible agreement and 0 the strongest possible disagreement between $X_{VRU}$ and $X_{vehicle}$.

According to some embodiments, the method of automatically detecting jaywalking of a VRU may comprise a set of rules based on the convolution between $X_{VRU}$ and $X_{vehicle}$, such that: $C=X_{VRU}*X_{vehicle}$. In mathematics (in particular, functional analysis) convolution is a mathematical operation on two functions (f and g) that produces a third function (f*g) expressing how the shape of one relates to the other.

According to some embodiments, the method of automatically detecting that jaywalking of a VRU occurs may be based on the combination of a positive first determining, a positive second determining, and a positive third determining. For example, the mathematical relationship between the spatiotemporal set of the selected VRU ($X_{VRUselected}$), the spatiotemporal set of the plurality of VRUs ($X_{VRUplurality}$), and the spatiotemporal set of the plurality of vehicles ($X_{vehicle}$) for such positive fourth determining may be: combination of a positive first determining (e.g., corr ($X_{VRUselected}, X_{VRUplurality}$) near 0), a positive second determining (e.g., corr($X_{VRUselected}, X_{vehicle}$) near +1), and a positive third determining (e.g., corr($X_{VRUselected}, X_{safetypathVRU}$) near 0). The fourth determining is not limited to this example, and other sets of rules, and/or other mathematical relationships between the different spatiotemporal sets X, may be used for determining whether the VRU is jaywalking.

In some embodiments, other sets of past, current, and/or predicted data point and/or spatiotemporal data points may be used for such jaywalking determination. Also, the fourth determining may vary according to the jurisdiction or to the available spatiotemporal data. Accordingly, the fourth determining may comprise any sets or rules based on past, current, and/or predicted trajectories of VRUs and vehicles. In some embodiments, the fourth determining may comprise determining that the selected VRU is jaywalking when the detected current trajectory of the selected VRU substantially matches the first path, and when the predicted trajectory of the VRU substantially crosses the second path. Correspondingly, if the fourth determining is based on correlation, the first rule may state that $R=corr(X_{VRUselected}, X_{VRUplurality})$ is smaller than about 0.25, smaller than about 0.10, smaller than about 0.05, or smaller than about 0.01; and the second rule may state that $R=corr(X_{VRUselected}, X_{vehicle})$ is larger than about 0.75, larger than about 0.90, larger than about 0.95, or larger than about 0.99.

In some embodiments, the fourth determining may comprise determining that a VRU is jaywalking when the predicted trajectory of the selected VRU substantially crosses the second path (e.g., corr($X_{VRUselected}, X_{vehicle}$) near +1), and when the predicted trajectory of the selected VRU is substantially distal to the third path (e.g., corr ($X_{VRUselected}, X_{safetypathVRU}$) near 0).

In some embodiments, the fourth determining may comprise determining that a VRU is jaywalking when the detected current trajectory of the selected VRU substantially matches the first path (e.g., corr($X_{VRUselected}, X_{VRUplurality}$) near 0), and when the predicted trajectory of the selected VRU substantially crosses the second path (e.g., corr ($X_{VRUselected}, X_{vehicle}$) near +1), and when the predicted trajectory of same VRU is substantially distal to the third path (e.g., corr($X_{VRUselected}, X_{safetypathVRU}$) near 0).

In some embodiments, the fourth determining may comprise a set of rules wherein the first determining further comprises determining whether the detected current trajectory of the selected VRU includes excess signal in speed, acceleration, gyroscopy, or a combination thereof. Such excess signal may occur when a VRU crosses raised transitions between sidewalks and roads at the spatiotemporal points $X=(x, y, z)$ corresponding to transitions between sidewalk and roadway.

The fourth determining may not be limited to the preceding examples and may consider other sets of rules based on past, current, and/or predicted trajectories of VRUs and vehicles, as the jaywalking determination includes comparing a set of past, current and/or predicted expanded spatiotemporal points $X=(x, y, z, t, dz/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$ between a selected VRU ($X_{VRUselected}$) and a plurality of VRUs ($X_{VRUplurality}$) and a plurality of vehicles ($X_{vehicle}$), moving along trajectories represented by their geolocation, velocity, and/or gyroscopic coordinates in three-dimensional space and time.

Accordingly, various nuances may be considered when determining jaywalking, since the present method for automatically detecting jaywalking may comprise a wide range of possible different combinations. In some embodiments, a method for automatically detecting jaywalking of a VRU may further comprise detecting, at a computing device, the current moving trajectories of vehicles proximal to the current moving trajectory of a VRU. The fourth determining may further comprise determining that the selected VRU is "non-intentionally jaywalking" when the detected trajectory of the selected VRU substantially matches the first path, the predicted trajectory of the selected VRU substantially crosses the second path, and the detected current trajectories of vehicles substantially match the third path. In such example, jaywalking may be considered non-intentional, and/or forced by events, and, by doing so, may resolve a conflicting issue in order to avoid an obstacle or a danger by taking a path other than at a suitable crossing point. In such circumstances, non-intentional jaywalking may involve a set of moral rules and moral conflict resolution choices wherein obeying traffic laws is weighted with a lesser priority than minimizing risks to persons or property.

In some embodiments, a method for automatically detecting jaywalking of a VRU may further comprise storing, at a memory, past geolocation information data of accidents involving vehicles and VRUs. The fourth determining may further comprise determining that a VRU is "hazardously jaywalking" when the predicted trajectory of the selected VRU is substantially proximal to the past geolocation information data of accidents involving vehicles and VRUs.

In some embodiments, the fourth determining may further comprise determining that a VRU is "hazardously jaywalking" when the predicted trajectory of the selected VRU substantially crosses the second path, and the second path has an average speed of more than about 50 km/h, e.g., when the expanded spatiotemporal points of $X_{vehicle}$ has an average speed of more than about 50 km/h.

The fourth determining may not be limited to the preceding examples and nuances and may consider other sets or rules based on past, current, and/or predicted trajectories of VRUs and vehicles.

Various embodiments provide an improved jaywalking detection system for determining jaywalking, e.g., by classifying a VRU's trajectory as either being "jaywalking" or "not jaywalking". For example, a VRU's trajectory can be determined jaywalking if the following two conditions are satisfied: 1) the path the VRU is taking is not frequently (hereinafter to be interchangeably used with "infrequently") taken by VRUs (using some threshold, for example) and 2) the VRU's predicted path will cross another path frequently taken by vehicles (gain, using some threshold, for example). If a system were to identify any area frequently occupied by vehicles as jaywalking, the system may falsely identify locations such as crossing walks, bridges and tunnels. On the other hand, if a system were to identify any location that pedestrians do not pass frequently as potential jaywalking, less frequent paths, areas with grass, etc. would be identified. Thus, combination of these two conditions may properly determine whether or not a VRU's road behavior is jaywalking.

FIG. 1 represents a street corner scenario including streets 200 and sidewalks 100. Vehicles travel only on the streets 200 whereas VRUs 10 (see FIG. 2) may travel on the sidewalks 100 and on the streets 200. One or more infrastructure devices 50 (see FIG. 2) may be disposed at the sidewalks 100.

Figure 2:
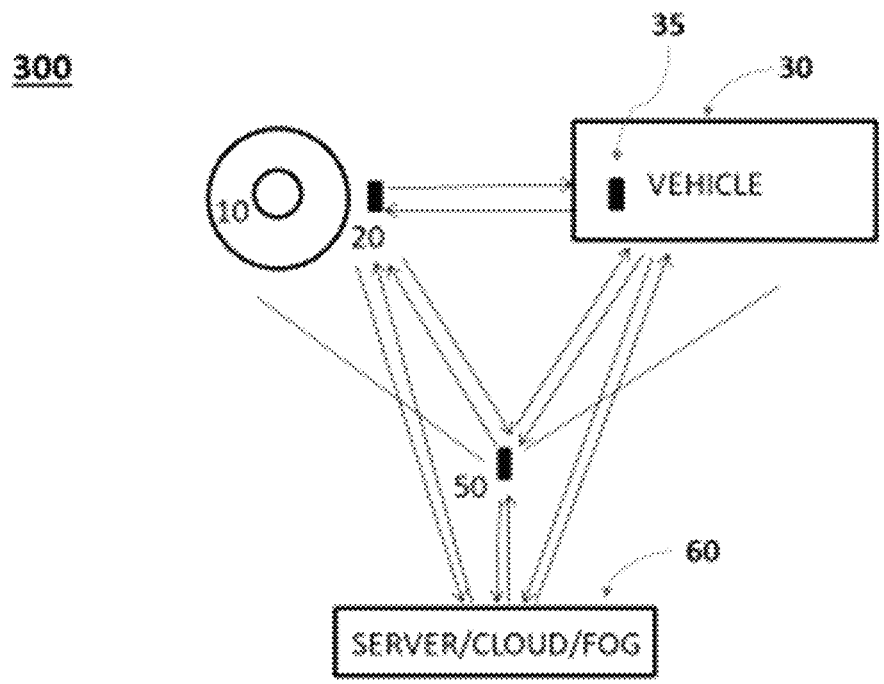
FIG. 2 is an example diagram of a system for detecting or determining jaywalking according to an embodiment of the described technology.

FIG. 2 is an example diagram of a system 300 for detecting or determining jaywalking according to an embodiment of the described technology. FIG. 2 is merely an example jaywalking detection system, and certain elements may be modified or removed, and/or other elements or equipment may be added. The system 300 may include a VRU UE terminal 20 proximal to a VRU 10, a vehicle UE terminal 35 proximal to a vehicle 30, an infrastructure terminal 50, and a server/cloud/fog information terminal 60. The VRU 10 may include a pedestrian, a wheelchair user, a bike user, an electric scooter user, a motorcycle user, etc. The VRU UE terminal 20 may include a smartphone, an internet of things (IoT) device, a credit card, a fabric, a tablet, or any other portable information terminal or UE terminal. The VRU UE terminal 20 may be inserted in the pocket of the VRU 10 or held by the VRU 10. The vehicle 30 may include a car, a truck, a SUV, an autonomous vehicle, a drone, or any other motorized vehicle. The vehicle UE terminal 35 may include a smartphone, an IoT device, an advanced driver assistant system (ADAS), an automated driving system (ADS), etc. The vehicle UE terminal 35 may be attached to the dashboard of the vehicle 30, or disposed somewhere inside the vehicle 35. The infrastructure terminal 50 may include an LTE BS, a WiFi router, a Bluetooth node, etc. The VRU UE terminal 20, the vehicle UE terminal 35, and the infrastructure terminal 50 may wirelessly communicate data to each other and to the server/cloud/fog 60 via wireless communications technology such as LTE 4G- or 5G-cellular technologies, WiFi technologies, Bluetooth technologies, etc.

Still referring to FIG. 2, the system 300 involves at least one vehicle 30 and at least one VRU 10. The VRU 10 may be physically linked to at least one UE terminal 20 having wireless communications capabilities. Each vehicle 30 may also be physically linked to at least one UE terminal 35 having wireless communications capabilities. As used herein, the term 'physically linked' generally refers to a proximal combination, association, attachment, and/or coupling between a wireless communications capable UE terminal and a VRU or a vehicle. For example, an LTE-capable UE terminal may be physically linked to the VRU 10, such as a mobile phone, inserted in the pocket of the VRU 10, or may be physically linked to the vehicle 30, such as a mobile phone secured on the dash board of the vehicle 30 or integrated within an ADS of the vehicle 30.

According to one embodiment, at least one of the terminals (20/35/50/60) may detect that the VRU 10 is jaywalking based on a first determination of whether the VRU's 10 walking trajectory substantially matches a path that is not frequently taken by other VRUs 10 and a second determination of whether the VRU's 10 predicted path will cross another path frequently taken by vehicles 30. For example, at least one of the terminals (20/35/50/60) may determine that VRU 10 is jaywalking when both the first determination and the second determination are positive. In other embodiments, at least one of the terminals (20/35/50/60) may determine that VRU 10 is jaywalking when either the first determination or the second determination is positive. Here, "substantially match" may generally refer to "complete the same," "almost the same," "substantially similar," and/or "the same in a substantial degree." Non-limiting examples of the "substantially match" may generally refer to any statistical threshold value that may include a match of the two paths with a normalized degree of about 100%, about 99%, about 95%, about 90%, about 80%, about 75%, etc. Correspondingly, if the jaywalking determining is based on correlation, "substantially match" may state that the correlation coefficient R=corr ($X_{VRU}$, $X_{vehicle}$) is larger than about 0.75, larger than about 0.90, larger than about 0.95, or larger than about 0.99. Correspondingly, if the jaywalking determining is based on correlation, "substantially infrequent" may state that the correlation coefficient R=corr ($X_{VRUselected}$, $X_{VRUplurality}$) is smaller than about 0.25, smaller than about 0.10, smaller than about 0.05, or smaller than about 0.01. These are merely examples, and other threshold values for positive jaywalking determinations are also possible depending on the embodiments and applications.

In some embodiments, at least one of the terminals (20/35/50/60) may detect that the VRU 10 is jaywalking based on a first determination of whether the VRU's 10 walking trajectory substantially matches a path that is not frequently taken by other VRUs 10 and a second determination of whether the VRU's 10 predicted path will cross another path frequently taken by vehicles 30. In this embodiment, if the jaywalking determining is based on correlation, the first rule may state that R=corr ($X_{VRUselected}$, $X_{VRUplurality}$) is smaller than about 0.25, smaller than about 0.10, smaller than about 0.05, smaller than about 0.01; and the second rule may state that R=corr ($X_{VRUselected}$, $X_{vehicle}$) is larger than about 0.75, larger than about 0.90, larger than about 0.95, or larger than about 0.99. Other threshold values for positive jaywalking determinations are also possible depending on the embodiments and applications.

In some embodiments, at least one of the terminals (20/35/50/60) may detect that the VRU 10 is jaywalking based on a first determination of whether the VRU's 10 predicted trajectory and proximity threshold limit substantially overlap a path that is not frequently taken by other VRUs 10 and a second determination of whether the VRU's 10 predicted trajectory and proximity threshold limit substantially overlap another path frequently taken by vehicles 30. Here, "substantially overlap" may also refer to any statistical threshold value or overlap integral value.

In some embodiments, at least one of the terminals (20/35/50/60), in response to the determining that the VRU 10 is jaywalking, may further set a danger notification to one or more of the remaining terminals, the danger notification pertaining to road usage safety. The danger notification may include an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof.

In some embodiments, the notification comprises transmitting the danger notification to the UE terminal 20 of the VRU 10, the UE terminal 35 of a nearby vehicle 30, to the ADAS 35 of the nearby vehicle 30, a communications network infrastructure, or to a road traffic infrastructure, or to a pedestrian crosswalk infrastructure 50, a computer server, an edge computing device, an IoT device, a fog computing device, a cloud computing device, any information terminal pertaining to the field of road safety, or to any combination thereof.

In some embodiments, the notification may comprise transmitting the danger notification to the UE terminal 20 of the VRU 10, the UE terminal 35 of a nearby vehicle 30, the ADAS 35 of the nearby vehicle 30, the infrastructure terminal 50 which may include a road traffic infrastructure, a pedestrian crosswalk infrastructure, a computer server, an edge computing device, an IoT device, a fog computing device, a cloud computing device, any information terminal pertaining to the field of road safety, or to a combination thereof. The danger notification may include a warning signal sent directly or indirectly to the vehicle terminal 35 in response to determining that the VRU 10 is jaywalking so that the vehicle 30 may slow down or stop to avoid or mitigate collision between the vehicle 30 and the VRU 10.

At least one of the terminals (20/35/50/60), in response to the determining that the VRU 10 is jaywalking, may send a warning signal directly or indirectly to the VRU device 20 in response to determining that the VRU 10 is jaywalking so that the VRU 10 is warned of the vehicle 30 approaching the VRU 10.

Figure 3:
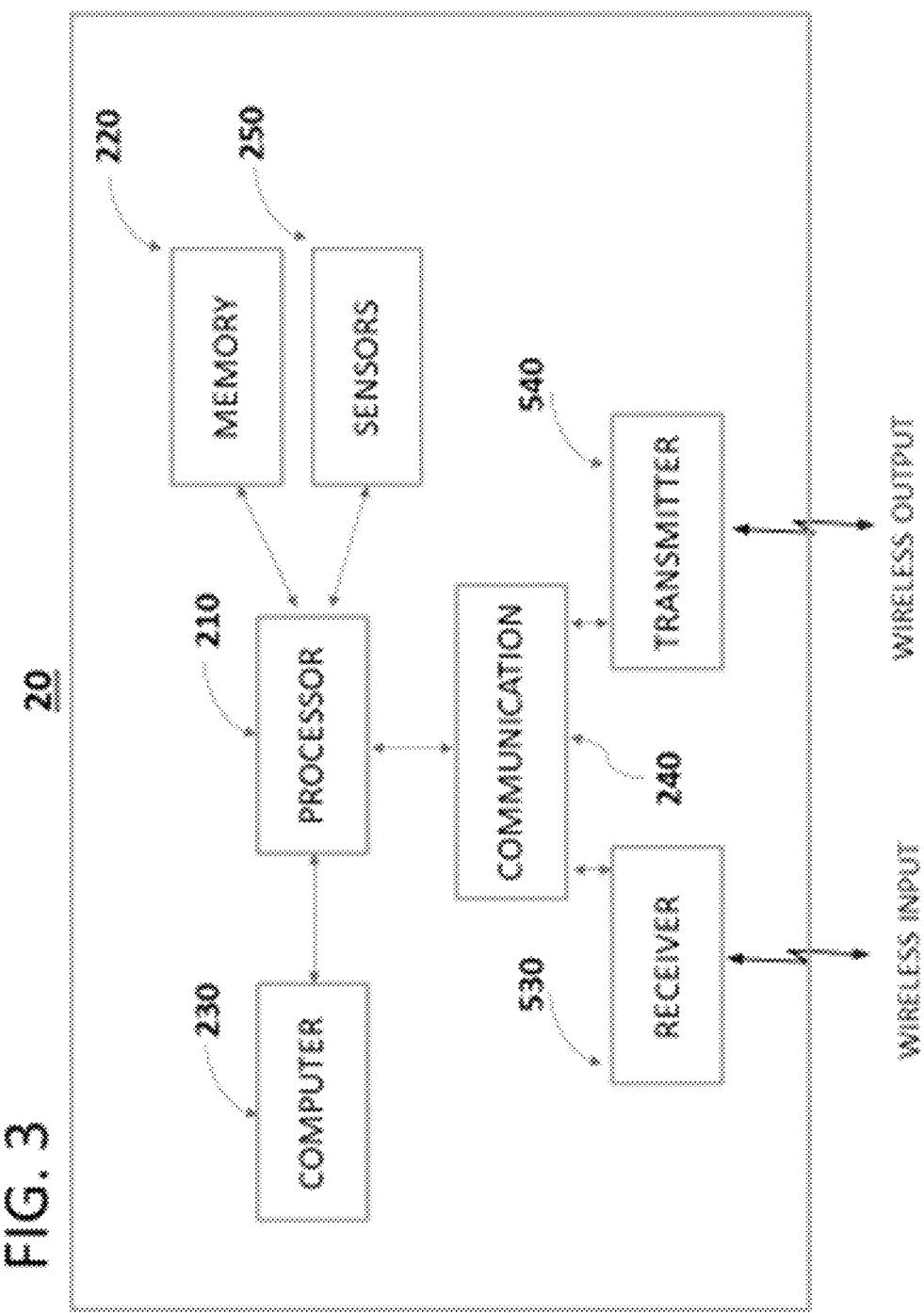
FIG. 3 is an example block diagram of the VRU UE terminal for determining jaywalking according to an embodiment of the described technology.

FIG. 3 is an example block diagram of the VRU UE terminal 20 for determining jaywalking according to an embodiment of the described technology. According to one embodiment, the VRU UE terminal 20 may include a processor (or a controller) 210, a memory 220, a computer (or a computing device) 230, a communications device (or a communication circuit) 240, and one or more sensors 250. In some embodiments, the communications device 240 may further comprise a receiver 530 for receiving wireless data, and a transmitter 540 for sending wireless data. In some embodiments, at least one of the processor 210, the memory 220, the computer 230, the communications device 240, and the sensors 250 may be integrated within the body of Android based smartphones, tablets, iPhones, and/or iPads. In other embodiments, at least one of the processor 210, the memory 220, the computer 230, the communications device 240, and the sensors 250 may be integrated totally or partially within other portable information terminals. FIG. 3 is merely an example block diagram of a VRU UE terminal 20, and certain elements may be removed, other elements added, two or more elements combined or one element can be separated into multiple elements depending on the specification and requirements.

In some embodiments, the memory 220 may include a device that stores information pertaining to past, current, and/or predicted trajectories of VRUs 10 and vehicles 30, and also store instructions to be performed by the processor 210. The processor 210 may include a hardware device that executes a program (which may be called a firmware), such as a multipurpose, clock driven, register based, digital integrated microprocessor that accepts binary data as input, processes it according to instructions stored in the memory 220 and provides results as output. The results usually include coherently sequencing the memory 220, the computer 230, the communications device 240, and the sensors 250 linked to it and making sure they work together as programmed in the firmware. The computer 230 may include a device that is instructed to carry out sequences of arithmetic or logical operations automatically via computer programming, wherein the arithmetic or logical operations include software codes, firmware codes, hardware codes, or any combination of computational codes. The communications device 240 may include a device that executes send-and-receive data transmission instructions through wireless radio frequency channels, the send and receive instructions may be mediated by the receiver 530 for receiving wireless data, and by the transmitter 540 for sending wireless data, through specific IEEE protocols that may correspond to, for example, IEEE 802.11 and/or IEEE 802.15.4.

Figure 4:
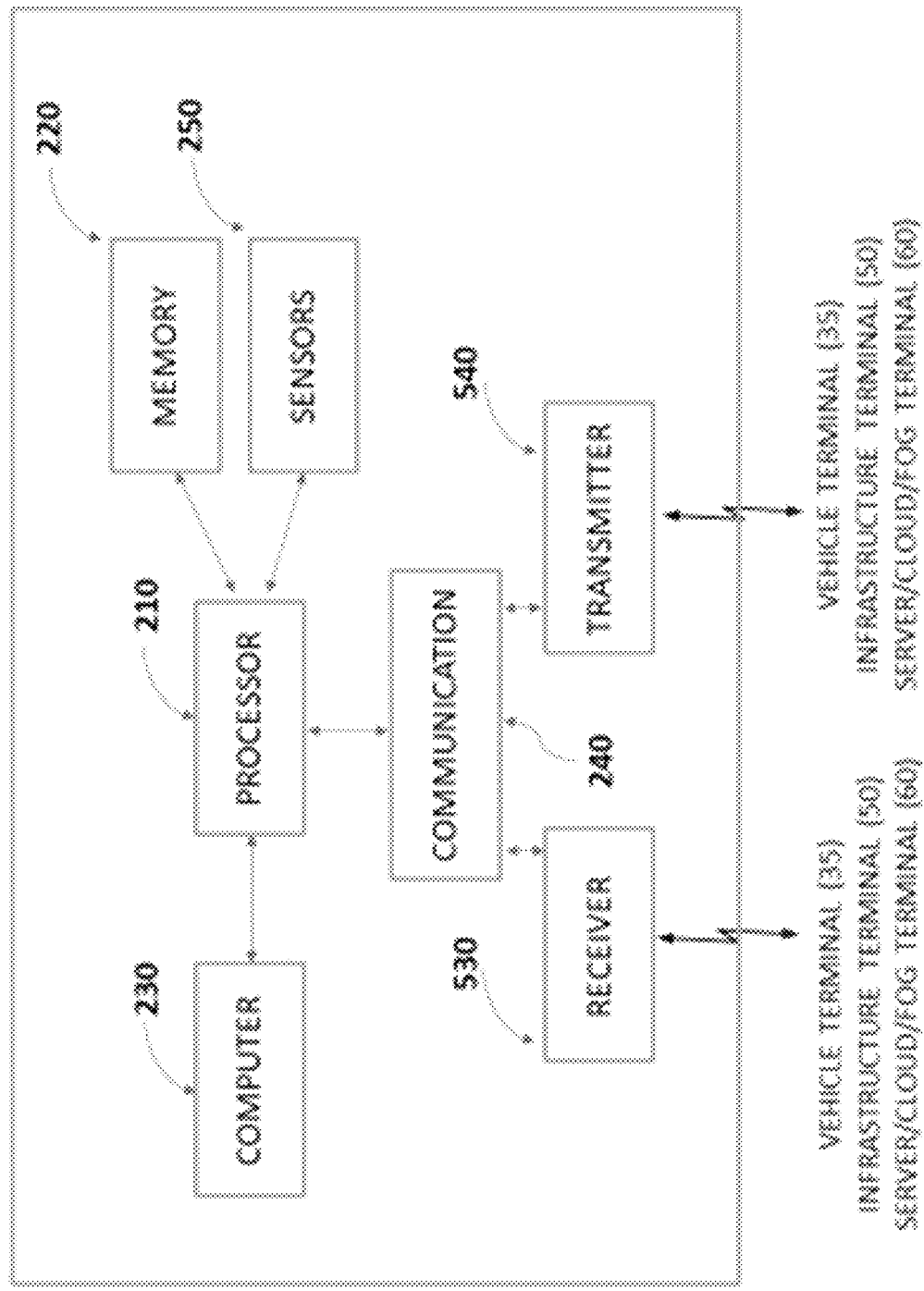
FIG. 4 is an example block diagram of the VRU UE terminal for determining jaywalking according to another embodiment of the described technology.

FIG. 4 is an example block diagram of the VRU UE terminal 20 for determining jaywalking according to another embodiment of the described technology. According to one embodiment, the VRU UE terminal 20 may receive data from any one of the other terminals (35/50/60) through the receiver 530, which may correspond to a danger notification from at least one of the other terminals, the danger notification pertaining to road usage safety. The danger notification may include an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof, to the benefit of the VRU 10.

Still referring to FIG. 4 and according to one embodiment, the VRU UE terminal 20 may compute, using the computer 230, the predicted spatiotemporal positioning of the VRU 10 using past and current positioning data acquired by the sensors 250 and stored by the memory 220, through the firmware programming of the processor 210, and determine, at the computing device 230, whether or not the VRU 10 is jaywalking based on pre-programmed sets of rules. The processor 210 may then instruct the communications device 240 to relay, through the transmitter 540, a danger notification to any one of the other terminals (35/50/60), the danger notification pertaining to road usage safety. The processor 210 may also instruct the VRU UE terminal 20 to display a danger notification to the VRU 10. The danger notifications may include an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof, to the benefit of the VRU 10 and/or the vehicle 30. For example, the computer 230 may determine that VRU 10 is jaywalking when the VRU's 10 walking trajectory substantially matches a path that is not frequently taken by other VRUs 10 and when the VRU's 10 predicted path will cross another path frequently taken by vehicles 30. The processor 210 may then control the transmitter 540 to send a warning signal directly or indirectly to the vehicle terminal 35 in response to determining that the VRU 10 is jaywalking, so that the vehicle 30 may slow down or stop to avoid or mitigate collision between the vehicle 30 and the VRU 10. Moreover, the processor 210 may then also control the transmitter 540 to send a warning signal directly or indirectly to the vehicle terminal 35, the infrastructure terminal 50, and/or the server/cloud/fog terminal 60 when the computer 230 determines that the VRU 10 is jaywalking.

Figure 5:
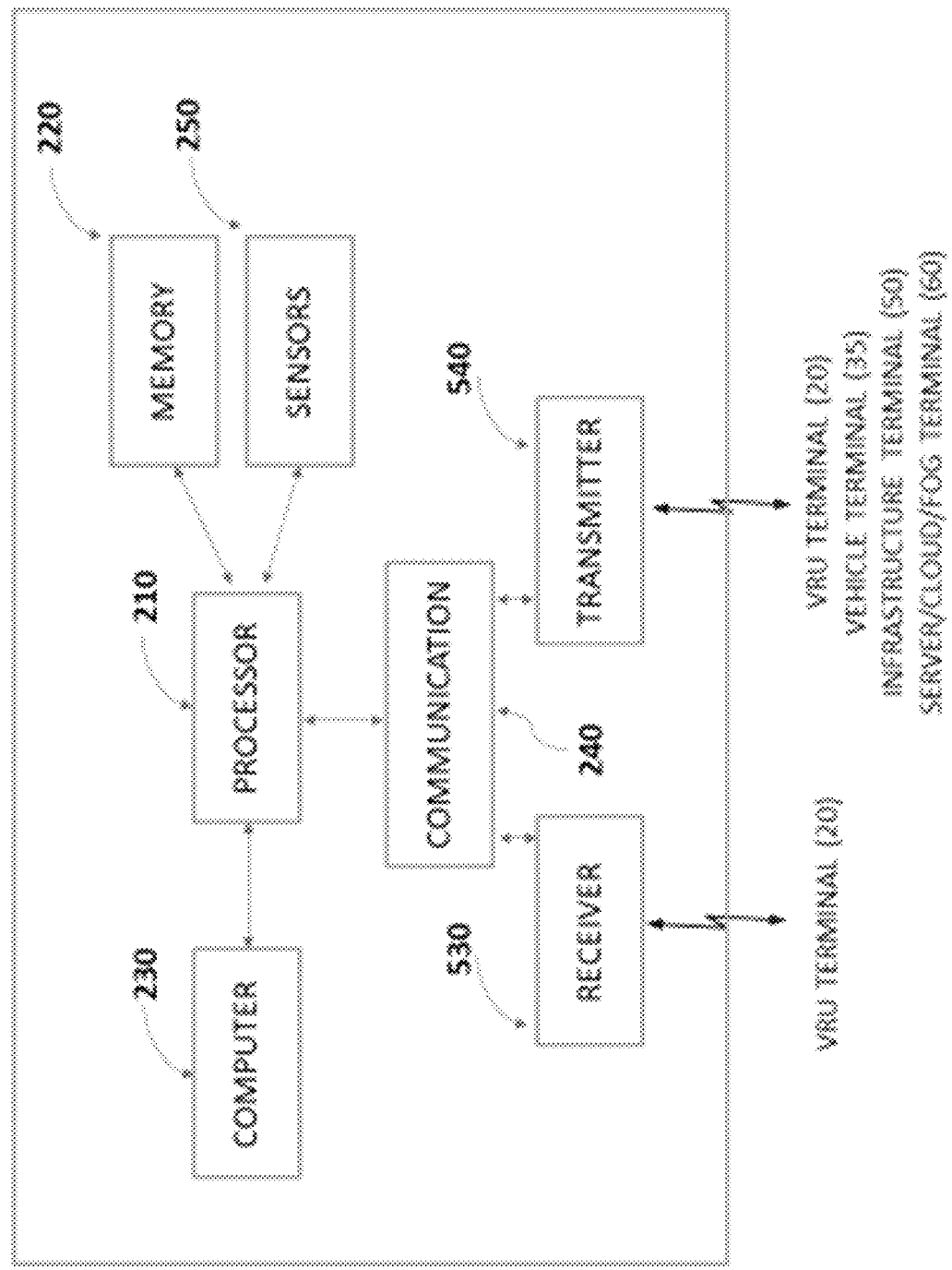
FIG. 5 is an example block diagram of any one of the vehicle, or infrastructure, or server terminals for determining jaywalking according to an embodiment of the described technology.

FIG. 5 is an example block diagram of the vehicle terminal 35 according to an embodiment of the described technology. According to one embodiment, the vehicle terminal 35 may receive data from the VRU UE terminal 20 through the receiver 530, in which the data may correspond to a danger notification computed by the VRU UE terminal 20, the danger notification pertaining to road usage safety. The data from the VRU UE terminal 20 may be received directly by the vehicle terminal 35 in response to determining that the VRU 10 is jaywalking, so that the vehicle 30 may slow down or stop to avoid or mitigate collision between the vehicle 30 and the VRU 10. FIG. 5 is merely an example block diagram of the vehicle terminal 35, and certain elements may be removed, other elements added, two or more elements combined or one element can be separated into multiple elements depending on the specification and requirements. In some embodiments, at least one of the processor 210, the memory 220, the computer 230, the communications device 240, and the sensors 250 may be integrated within the body of Android based smartphones, tablets, iPhones, and/or iPads secured on the dash board of the vehicle 30 or integrated within an ADS of the vehicle 30.

The block diagram of FIG. 5 can be applied to any one of the vehicle terminal 35, infrastructure terminal 50, or server terminal 60 for determining whether a VRU 10 is jaywalking according to an embodiment of the described technology. According to one embodiment, any one of the terminal (35/50/60) may receive data from the VRU UE terminal 20 through the receiver 530 embedded within the terminal, in which the data may correspond to VRU sensors data, VRU memory data, VRU computing data, the danger notification computed by the VRU UE terminal 20, or a combination thereof. The data from the VRU UE terminal 20 may be received by the vehicle terminal 35, the infrastructure terminal 50, and/or the server/cloud/fog terminal 60 via wireless communications technology embedded in the VRU UE terminal 20 such as LTE 4G- or 5G-cellular technologies, WiFi technologies, Bluetooth technologies, etc. The data from the VRU UE terminal 20 may be sent in response to determining that the VRU 10 is jaywalking, and/or in response to a request of performing a jaywalking determination using vehicle, infrastructure, and/or server computing devices 230. For example, the dead reckoning techniques and/or AI techniques used for computing the predicted trajectory of the VRU may be performed by cloud computing, whereas the raw sensors and memory data from the VRU UE terminal 20 may be transmitted to the cloud server or terminal 60 for computational purposes and for jaywalking detection and determination purposes, whereas a danger notification may be sent back to the VRU UE terminal 20 if jaywalking is detected. FIG. 5 is merely an example block diagram of the vehicle terminal 35, infrastructure terminal 50, or server terminal 60, and certain elements may be removed, other elements added, two or more elements combined or one element can be separated into multiple elements depending on the specification and requirements.

In some embodiments, the computer 230 may comprise computer-executable instructions configured to perform a method of automatically detecting jaywalking of a VRU 10. The method may comprise storing, at a memory 220, past trajectory data of a plurality of vehicles 30 and a plurality of VRUs 10 and detecting, at a computing device 230, a current trajectory of a VRU 10. The method may also include first determining, at the computing device 230, whether the detected current trajectory of the VRU 10 substantially matches a first path infrequently taken by at least one of the plurality of VRUs 10 based on the past trajectory data of the plurality of VRUs 10. The method may further include obtaining, at the computing device 230, a predicted trajectory of the VRU 10. The method may further include second determining, at the computing device 230, whether the predicted trajectory of the VRU 10 crosses a second path frequently taken by at least one of the plurality of vehicles 30 based on the past trajectory data of the plurality of vehicles 30, the second path different from the first path. The method may further include third determining, at the computing device 230, whether the predicted trajectory of the VRU 10 is substantially distal to a third path marked for VRU 10 use. The method may further include fourth determining, at the computing device 230, whether or not the VRU 10 is jaywalking based on the first determining, the second determining, and/or the third determining.

In some embodiments, the computer 230 may be integrated within the processor 210. As used herein, the term 'integrated' is intended to refer to a proximal combination, association, attachment, and/or coupling between the computer 230 and the processor 210, such that the processor 210 and the computer 230 may operate within the same clock operating drive, and/or within the same synchronization reference.

In some embodiments, the VRU UE terminal 20, the vehicle terminal 35, the infrastructure terminal 50, and/or the server terminal 60 may be configured as a system for automatically detecting jaywalking of a VRU 10. The system can comprise a plurality of LTE-capable UE terminals 20 linked to a plurality of VRUs 10 and a plurality of LTE-capable UE terminals 35 linked to a plurality of vehicles 30. The system can further comprise a memory device 220 embedded in each of the UE terminals 20 and 35 configured to store past trajectory data and the sensors 250 embedded in each of the UE terminals 20 and 35 configured to measure position, speed, acceleration, gyroscopic data, or a combination thereof. The system can still further comprise a wireless communications device 240 embedded in each of the UE terminals 20 and 35 configured to send and receive data and a processor device 210 embedded in each of the UE terminals 20 and 35 comprising a computing device 230. The computing device 230 can be configured to detect a current trajectory of any one of the plurality of VRUs 10 and to first determine whether the detected current trajectory of any one of the plurality of VRUs 10 substantially matches a first path infrequently taken by the plurality of VRUs 10 based on the past trajectory data of the plurality of VRUs 10. The computing device 230 can be further configured to, if first determining is positive, tag as selected VRU 10 and to obtain a predicted trajectory of the selected VRU 10. The computing device 230 can further be configured to second determine whether the predicted trajectory of the selected VRU 10 crosses a second path frequently taken by the plurality of vehicles 30, the second path different from the first path. The computing device 230 can also be configured to third determine whether the predicted trajectory of the selected VRU 10 is substantially distal to a third path marked for VRU 10 use. The computing device 230 can still further be configured to fourth determine whether a VRU 10 is jaywalking based on the first determining, the second determining, and/or the third determining. The computer 230 can comprise computer-executable instructions configured to perform a method of automatically detecting jaywalking of the VRU 10.

In some embodiments, the system for automatically detecting jaywalking of a VRU 10 may comprise, through the computing device 230, computer-executable instructions configured to perform a method of automatically detecting jaywalking of a VRU. The computer-executable instructions may include a software code, a firmware code, a hardware code, any combination of computational codes. The computer-executable instructions may further comprise a set of rules that take into account VRUs' 10 and vehicles' 30 past, current, and/or predicted trajectories, for determining that the VRU is jaywalking. The transmitter 540 may be configured with a list of provisions based on the rules in order to send danger notifications to other terminals. The danger notifications may include an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof.

Figure 6:
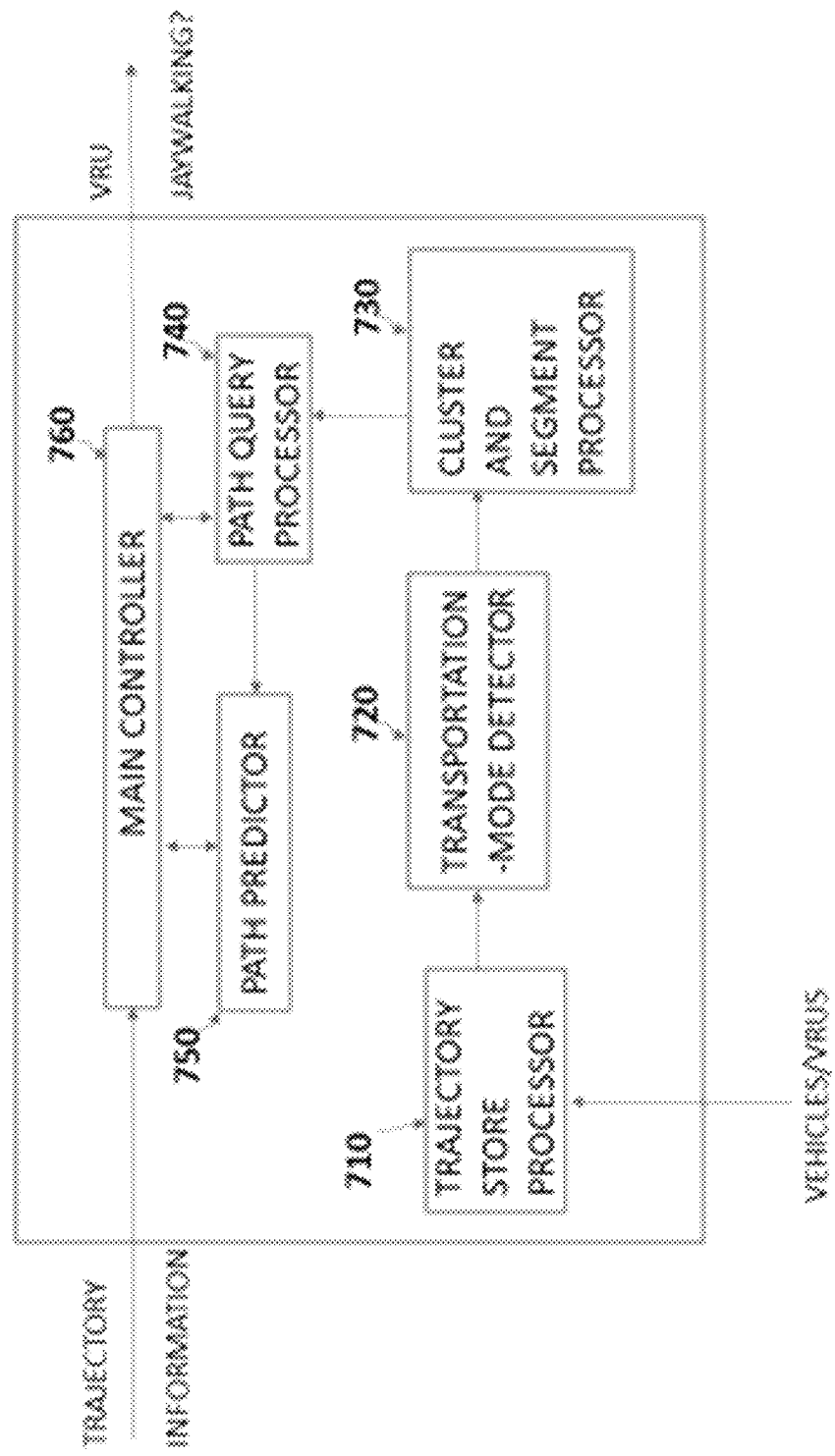
FIG. 6 is an example block diagram of a processor device comprising a computing device configured to determining jaywalking according to an embodiment of the described technology.

FIG. 6 is an example block diagram of a processor 70 comprising a computing device configured to determine jaywalking according to an embodiment of the described technology. FIG. 6 is merely an example block diagram of the processor 70, and certain elements may be removed, other elements added, two or more elements combined, or one element can be separated into multiple elements. The processor 70 may include a trajectory store processor 710, a transportation-mode detector 720, a cluster and segment processor 730, a path query processor 740, a path predictor 750, and a main controller 760. In some embodiments, one or more of the elements 710-760 can be included in the processor 210 of the VRU UE terminal 20, in the processor 210 of the vehicle terminal 35, in the processor 210 of the infrastructure terminal 50, and/or in the processor 210 of the server terminal 60. In other embodiments, one or more of the elements 710-760 may be disposed outside the terminals (20/35/50/60), and may communicate data with one or more of the processor 210 of the terminals (20/35/50/60).

The trajectory store processor 710 may collect series of location information over time of vehicles 30 and VRUs 10. The trajectory store processor 710 may obtain this information in many different ways and employ different technologies, both for identifying location and storing the data, for example, of GPS, GNSS, LTE, WiFi, Bluetooth, etc.

The transportation-mode detector 720 may receive the collected series of location, accelerometer, gyroscope, camera, and/or audio information and classify a trajectory as belonging to pedestrians or non-pedestrians (see, e.g., "*Real-Time Transportation Mode Detection via Tracking Global Positioning System Mobile Devices*" Byon et. al.). The cluster and segment processor 730 may break down the classified trajectories and group them to shorter paths along with visit-frequency information and transportation mode.

The path query processor 740 may, given a partial path, return the frequency of the path. The path query processor 740 may also, given a path P, return other paths P in its close vicinity. The path predictor 750 may, given a trajectory, possibly leverage information for the path query processor 740, and predict one or more next paths along with probabilities.

The main controller 760 may communicate data with and control operations of the components 710-750. The main controller 760 may communicate data with the path query processor 740 and the path predictor 750, receive VRU's current trajectory information and determine whether the VRU 10 is jaywalking.

Figure 7:
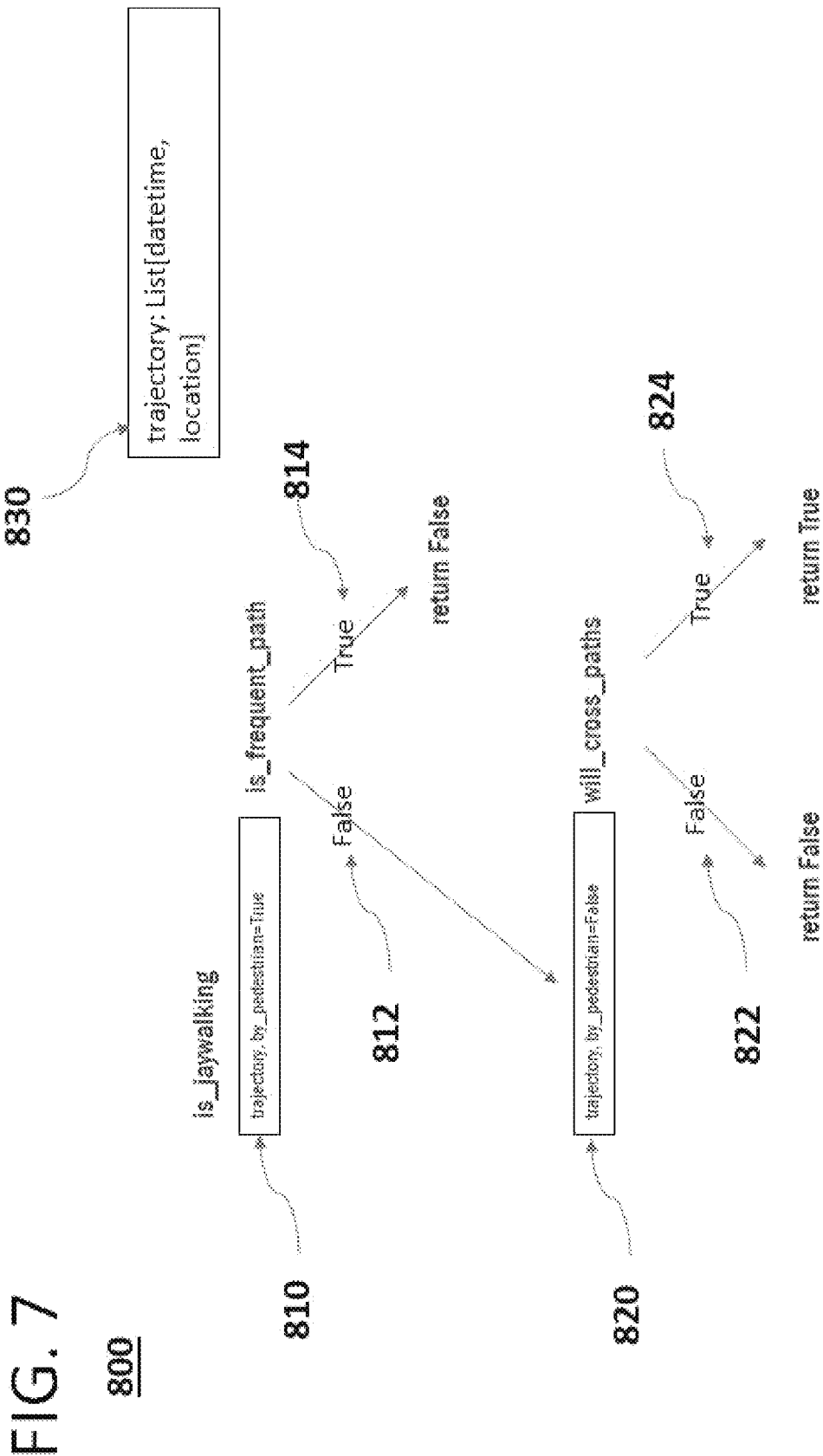
FIG. 7 is a flow diagram for determining jaywalking according to an embodiment of the described technology.

The main controller 760 will be described in greater detail by referring to FIG. 7. FIG. 7 is an example flow diagram 800 of the main controller 760 for determining jaywalking according to an embodiment of the described technology. Referring to FIG. 7, the main controller 760 may perform a frequent-path determination operation 810 and a cross-path determination operation 820 based on the trajectory information 830.

For example, in performing the frequent-path determination operation 810, the main controller 760 may use the path query processor 740 to retrieve the path information, and return False (812) or True (814) depending on the frequency and mode of transportation. Here, "False" (812) means that the VRU's 10 current trajectory substantially matches a path which is not frequently taken by other VRUs 10. Then, the main controller 760 may perform the cross-path determination operation 820.

In performing the cross-path determination operation 820, the main controller 760 may use the path predictor 740 to expand the current trajectory, use the path query processor 740 to retrieve paths in the vicinity, and finally evaluate the trajectory against the returned paths and check if they likely intersect. The main controller 760 may return False (822) or True (824) depending on whether the VRU's 10 trajectory likely intersects another path frequently taken by vehicles 30. Here, "False" (822) means that the VRU's 10 current trajectory is different from (or does not substantially match) the other path frequently taken by vehicles 30, and the main controller 760 may determine based on this that the VRU 10 is not jaywalking. "True" (824) means that VRU's 10 current trajectory intersects or substantially matches the other path frequently taken by vehicles 30, and the main controller 760 may determine based on this that the VRU 10 is jaywalking.

In some embodiments, the main controller 760 may use "helper functions," "helper components" and/or algorithms that can classify "means of transportation" given a trajectory or a video as well as algorithms that help identify roads given a large set of trajectories or other information.

The flow diagram 800 of FIG. 7 may be implemented with a pseudo code in Table 1 below. The pseudo code of Table 1 is merely an example and other codes or different arrangements of the code may also be used.

TABLE 1

```
def is_jaywalking(trajectory: List[datetime, location]):
    # We are on a path not frequented by pedestrians.
    if not is_frequent_path(trajectory, by_pedestrian=True):
        # And paths we might cross.
        crossed_paths = will_cross_paths(trajectory)
        for path in crossed_paths:
            # If any are frequented by non-pedestrians,
            if is_frequent_path(path, by_pedestrian=False):
                # Then we are jaywakng.
                return True
    # Otherwise, we are not jaywalking.
    return False
```

In some embodiments, the main controller 760 may rely on just two signals or two determination procedures. Various disclosed embodiments may be advantageous, as they can enhance simplicity, transparency and interpretability in detecting or determining jaywalking of VRUs 10. To further improve the accuracy of the determination, the main controller 760 may apply ML or DL. For example, the main controller 760 may take the two suggested signals described above, add more classic signals along with label information (e.g., jaywalking and not-jaywalking) and feed them to an ML algorithm such as logistic regression or neural network. Training on a richer set of signals may give results that are likely more accurate. However, ML often is a black box that could obscure the direct correlation to risk offered by leveraging the heuristic described above. Thus, both heuristic and ML approaches can be used in different situations and for different application.

Signals that can be used for the ML may include one or more of: i) a frequency that pedestrians are at this location, ii) whether the pedestrian's predicted trajectory crosses a frequent vehicle trajectory, iii) a frequency of the trajectories where the pedestrian is taking, iv) whether the pedestrian broke away from a frequent pedestrian trajectory they were following, v) average and standard deviation of the elevation of the different frequent trajectories, or vi) leveraging map matching: a) closeness to an area designated as pedestrian friendly (park, sidewalk, . . . ) and b) closeness to an area designated as a road, highway, etc. These signals are merely examples, and other signals may also be used.

FIG. 8 is an example flowchart of a process 900 for determining jaywalking according to an embodiment of the described technology. The process 900 can be performed by any one of the processor 210 of the VRU UE terminal 20, the vehicle terminal 35, the infrastructure terminal 50, the server/cloud/fog terminal 60, and/or the processor 70. The process 900 can be programmed with any type of programming languages including, but not limited to, Java (or JavaScript), React, Native, React Native, C++, Kotlin, Python, HTML5+CSS+JavaScript, or other mobile application languages. At least some states of the process 900 can be stored in any one of the memory 220 of the VRU UE terminal 20, the vehicle terminal 35, the infrastructure terminal 50, and/or the server/cloud/fog terminal 60. Although the process 900 is described herein with reference to a particular order, in various embodiments, states herein may be performed in a different order, or omitted, and additional states may be added. For the purpose of the convenience, the description will be provided based on the processor 70 performing the process 900.

Referring to FIG. 8, positive jaywalking determination is automatically obtained when the detected moving trajectory of the VRU 10 substantially matches the first path (e.g., path infrequently taken by the plurality of VRUs 10 based on the past trajectory data of the plurality of VRUs 10) and when the predicted path of the VRU 10 substantially crosses the second path (e.g., path frequently taken by at least one of the plurality of vehicles 30 based on the past trajectory data of the plurality of vehicles 30). In state 910, the processor 70 may store past trajectory data of vehicles 30 and VRUs 10. In state 920, the processor 70 may detect a VRU's 10 current moving trajectory on a road. In state 930, the processor 70 may first determine whether the VRU's 10 detected trajectory substantially matches a path that is not frequently (or infrequently) taken by VRUs 10 based on the past or historical trajectory data of VRUs 10. In some embodiments, the processor 70 may use an ML algorithm such as logistic regression or neural network in performing the state 930. For example, the ML algorithm may compare the VRU's 10 detected trajectory with one or more of VRUs' 10 historical paths. The comparison may include determining whether a value associated with the VRU's 10 detected trajectory corresponds with one or more values associate with VRUs' 10 historical paths. As used herein, the term "correspond" encompasses a range of relative relationships between two or more elements. Correspond may refer to equality (e.g., complete match). Correspond may also refer to partial-equality (e.g., partial match, fuzzy match, Soundex, etc.). Correspond may further refer to a value which falls within a range of values.

If it is determined in state 930 that the VRU's 10 detected trajectory does not substantially match or is different from a path infrequently (or not frequently) taken by other VRUs 10, the processor 70 may determine that the VRU 10 is not jaywalking (state 960), and the process 900 may end.

If it is determined in state 930 that the VRU's 10 detected trajectory substantially matches a path infrequently (or not frequently) taken by VRUs 10, the processor 70 may second determine whether the VRU's 10 predicted path will cross another different path frequently taken by vehicles 30 based on the past or historical trajectory data of vehicles 30 (state 940). In some embodiments, the processor 70 may use an ML algorithm such as logistic regression or neural network in performing the state 940. For example, the ML algorithm may compare the VRU's 10 predicted path with one or more of vehicles' 30 historical paths. The comparison may include determining whether a value associated with the VRU's 10 predicted path corresponds with one or more values associate with the vehicles' 30 historical paths.

If it is determined in state 940 that the VRU's 10 predicted path will not cross another different path frequently taken by the vehicles 30, the processor 70 may determine that the VRU 10 is not jaywalking (state 960), and the process 900 may end.

If it is determined in state 940 that the VRU's 10 predicted path will cross another different path frequently taken by vehicles 30, the processor 70 may determine that the VRU 10 is jaywalking (state 950). In state 970, the processor 70 may send a warning signal to nearby vehicles 30 indicating that the VRU 10 is jaywalking so as to avoid or minimize collision between the vehicles 30 and the VRU 10. In some embodiments, the VRU 10 may also receive the warning signal from the processor 70. In other embodiments, the VRU 10 may be notified or alerted about the jaywalking by the VRU's own terminal. In these embodiments, since both the VRU 10 and the vehicles are alerted about the VRU's jaywalking, a possible collision can be avoided or further minimized.

FIG. 9 is an example flowchart of a process 900a for determining jaywalking according to another embodiment of the described technology. The process 900a is similar to the process 900 of FIG. 8 except that states 932 and 942 in FIG. 9 are provided instead of states 930 and 940 of FIG. 8. After the VRU's current moving trajectory is detected in state 920, it is determined in state 932 whether the predicted trajectory of the VRU 10 substantially crosses another different path, for example, the second path (e.g., path frequently taken by at least one of the plurality of vehicles 30 based on the past trajectory data of the plurality of vehicles 30). If it is determined in state 932 that the VRU's 10 predicted path will not cross the second different path, the processor 70 may determine that the VRU 10 is not jaywalking (state 960), and the process 900 may end. If it is determined in state 932 that the VRU's 10 predicted path will substantially cross the second path, the processor 70 may second determine whether the predicted trajectory of the VRU 10 is substantially distal to a third path (e.g., path marked for VRU 10 use) (state 942). If it is determined in state 942 that the VRU's 10 predicted path will substantially cross the third path, the processor 70 may determine that the VRU 10 is jaywalking (state 950), and may warn nearby vehicles 30 about the VRU's 10 jaywalking so as to avoid or minimize collision between the vehicles 30 and the VRU 10 (state 970).

FIG. 10 is an example flowchart of a process 900b for determining jaywalking according to another embodiment of the described technology. The process 900b is similar to the process 900 of FIG. 8 except that states 935 and 955 are additionally provided in FIG. 10. As described above with respect to FIG. 8, positive jaywalking determination may be automatically obtained when the detected current trajectory of the VRU 10 substantially matches the first path (e.g., path infrequently taken by the plurality of VRUs 10 based on the past trajectory data of the plurality of VRUs 10) (state 930) and when the predicted trajectory of the VRU 10 substantially crosses the second path (e.g., path frequently taken by at least one of the plurality of vehicles 30 based on the past trajectory data of the plurality of vehicles 30) (state 940). The determination of jaywalking may be further nuanced by implementing state 935, where jaywalking may be considered hazardous, or risky, when the predicted trajectory of the VRU 10 is substantially proximal to past geolocation information data of accidents involving vehicles 30 and VRUs 10. If it is determined in state 935 that the VRU's 10 predicted trajectory is substantially proximal to past geolocation information data of accidents involving vehicles 30 and VRUs 10, the processor 70 may determine that the VRU 10 is hazardously jaywalking (state 955), and the process 900 may end. Any other states past the jaywalking state determination 950 may be introduced in order to provide nuances to the automatic jaywalking determination. In some embodiments, the states 950 and 970 may be omitted in FIG. 10. In these embodiments, when the predicted trajectory of the VRU 10 substantially crosses the second path in state 940, the processor 70 may determine whether the VRU's 10 predicted trajectory is substantially proximal to past geolocation information data of accidents involving vehicles 30 and VRUs 10, and if so, the processor 70 may determine that the VRU 10 is hazardously jaywalking (state 955).

In some embodiments, implementing state 935 may be defined, changed, and/or complemented such that the fourth determining leads to "hazardous jaywalking" when the predicted trajectory of the VRU 10 substantially crosses the second path, and when the second path has an average speed of more than about 50 km/h, e.g., when the expanded spatiotemporal points of vehicle 30 has an average speed of more than about 50 km/h.

FIG. 11 is an example flowchart of a process 1000 for preventing or mitigating collision based on determined jaywalking according to an embodiment of the described technology. The process 1000 may be performed by the processor 210 of the vehicle terminal 35. In state 1010, the processor 210 may control the vehicle 30 to drive, for example, at certain speeds. In state 1020, the processor 210 may determine whether the vehicle 30 has received a jaywalking warning signal from at least one of the VRU UE terminal 20, the infrastructure terminal 50, and/or the server/cloud/fog terminal 60.

If it is determined in state 1020 that the vehicle terminal 35 has not received the jaywalking warning signal, the state 1020 may repeat. If it is determined that the vehicle terminal 35 has received the jaywalking warning signal, the processor 210 may control the ADAS of the vehicle 30 to slow down or stop the vehicle 30 (state 1030). In some embodiments, the processor 210 may control the ADAS 35 to apply brake to slow down or stop the vehicle 30. In some embodiments, the processor 210 may control the transmission system of the vehicle 30 to apply engine braking (e.g., switching higher gear to lower gear) to slow down or stop the vehicle 30.

According to various disclosed embodiments, jaywalking of VRUs 10 can be more accurately determined. Furthermore, the jaywalking determination or detection can be simplified and faster. Furthermore, the jaywalking determination or detection may not be limited to the preceding examples and may consider other sets or rules based on past, current, and/or predicted trajectories of VRUs 10 and vehicles 30, as the jaywalking determination includes comparing a set of past, current and/or predicted expanded spatiotemporal points $X=(x, y, z, t, dz/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$ for a plurality of VRUs 10 and for a plurality of vehicles 30 moving along trajectories represented by their geolocation, velocity, and gyroscopic coordinates in three-dimensional space and time.

Those skilled in the art will appreciate that, in some embodiments, additional components and/or steps can be utilized, and disclosed components and/or steps can be combined or omitted.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, firmware, or software depends upon the particular application and design constraints imposed on the overall system. The described functionality may be implemented in varying ways for each particular application, but such implementation decisions should not be interpreted as causing a departure from the scope of the embodiments of the described technology.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

The above description discloses embodiments of systems, apparatuses, devices, methods, and materials of the present disclosure. This disclosure is susceptible to modifications in the components, parts, elements, steps, and materials, as well as alterations in the fabrication methods and equipment. Such modifications will become apparent to those skilled in the art from a consideration of this disclosure or practice of the disclosure. Consequently, it is not intended that the disclosure be limited to the specific embodiments disclosed herein, but that it cover all modifications and alternatives coming within the scope and spirit of the described technology.

What is claimed is:

1. A method of automatically detecting jaywalking of a vulnerable road user (VRU), the method comprising:
    storing, at a memory, past trajectory data of a plurality of vehicles and a plurality of VRUs, wherein each of the plurality of VRUs and each of the plurality of vehicles are linked to a long-term evolution (LTE)-capable user equipment (UE) terminal having an international mobile subscriber identity (IMSI);
    detecting, at a computing device, a current trajectory of a first one of the plurality of VRUs;
    first determining, at the computing device, whether the detected current trajectory of the first VRU substantially matches a first path taken by the plurality of VRUs less frequently than a first threshold value based on the past trajectory data of the plurality of VRUs;
    in response to the detected current trajectory of the first VRU substantially matching the first path, tagging, at the computing device, the first VRU as a selected VRU;
    obtaining, at the computing device, a predicted trajectory of the selected VRU;
    second determining, at the computing device, whether the predicted trajectory of the selected VRU crosses a second path taken by the plurality of vehicles more frequently than a second threshold value based on the past trajectory data of the plurality of vehicles, the second path being different from the first path;
    third determining, at the computing device, whether the predicted trajectory of the selected VRU is substantially distal to a third path marked for VRU use; and
    fourth determining, at the computing device, whether the selected VRU is jaywalking based on one or more of the first determining, the second determining, and the third determining.

2. The method of claim 1, wherein the fourth determining includes a set of rules that take into account the plurality of VRUs' and the plurality of vehicles' past, current, and predicted trajectories, wherein the set of rules is based on a mathematical relationship between the plurality of VRUs' and the plurality of vehicles' past, current, and predicted trajectories, and wherein the trajectories comprise position data, speed data, acceleration data, gyroscopy data, or a combination thereof.

3. The method of claim 2, wherein the fourth determining comprises determining that the selected VRU is jaywalking when the detected current trajectory of the selected VRU substantially matches the first path, and when the predicted trajectory of the selected VRU substantially crosses the second path.

4. The method of claim 2, wherein the fourth determining comprises determining that the selected VRU is jaywalking when the detected current trajectory of the selected VRU substantially matches the first path, when the predicted trajectory of the selected VRU substantially crosses the second path, and when the predicted trajectory of the selected VRU is substantially distal to the third path.

5. The method of claim 2, wherein the first determining further comprises determining, at the computing device, whether the detected current trajectory of the selected VRU includes an excess signal in speed, acceleration, gyroscopy, or a combination thereof.

6. The method of claim 2, wherein the fourth determining comprises determining that the selected VRU is jaywalking when the predicted trajectory of the selected VRU substantially crosses the second path, and when the predicted trajectory of the selected VRU is substantially distal to the third path, the method further comprising, in response to the determining that the selected VRU is jaywalking, setting a danger notification pertaining to road usage safety.

7. The method of claim 6, wherein the danger notification includes: an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof.

8. The method of claim 6, further comprising:
transmitting the danger notification to the UE terminal of the selected VRU, the UE terminal of a nearby vehicle, an advanced driver assistant system of the nearby vehicle, a communications network infrastructure, a road traffic infrastructure, a pedestrian crosswalk infrastructure, a computer server, an edge computing device, an Internet of things (IoT) device, a fog computing device, a cloud computing device, any information terminal pertaining to the field of road safety, or a combination thereof.

9. The method of claim 1, further comprising detecting, at the computing device, the current trajectories of vehicles proximal to the current trajectory of the selected VRU, wherein the fourth determining further comprises determining that the selected VRU is non-intentionally jaywalking when the detected trajectory of the selected VRU substantially matches the first path, when the predicted trajectory of the selected VRU substantially crosses the second path, and when the detected current trajectories of vehicles substantially match the third path.

10. The method of claim 1, further comprising storing, at the memory, past geolocation information data of accidents involving the plurality of vehicles and the plurality of VRUs, wherein the fourth determining further comprises determining that the selected VRU is hazardously jaywalking when the predicted trajectory of the selected VRU is substantially proximal to the past geolocation information data of accidents involving the plurality of vehicles and the plurality of VRUs.

11. The method of claim 2, wherein the fourth determining further comprises determining that the selected VRU is hazardously jaywalking when the predicted trajectory of the selected VRU substantially crosses the second path, and when the second path has an average speed of more than about 50 km/h.

12. A system for automatically detecting jaywalking of a vulnerable road user (VRU), the system comprising:
a memory device configured to store past trajectory data of a plurality of vehicles and a plurality of VRUs; and
a processor device comprising a computing device configured to:
detect a current trajectory of a first one of the plurality of VRUs, each of the plurality of VRUs and each of the plurality of vehicles configured to be linked to a long-term evolution (LTE)-capable user equipment (UE) terminal;
first determine whether the detected current trajectory of the first VRU substantially matches a first path taken by the plurality of VRUs less frequently than a first threshold value based on the past trajectory data of the plurality of VRUs;
in response to the detected current trajectory of the first VRU substantially matching the first path, tag the first VRU as a selected VRU;
obtain a predicted trajectory of the selected VRU;
second determine whether the predicted trajectory of the selected VRU crosses a second path taken by the plurality of vehicles more frequently than a second threshold value, the second path different from the first path;
third determine whether the predicted trajectory of the selected VRU is substantially distal to a third path marked for VRU use; and
fourth determine whether the selected VRU is jaywalking based on one or more of the first determining, the second determining, and the third determining.

13. The system of claim 12, wherein the computing device comprises computer-executable instructions configured to automatically detect jaywalking of the selected VRU.

14. The system of claim 13, wherein the computing device is configured to determine that the selected VRU is jaywalking when the detected current trajectory of the selected VRU substantially matches the first path, and when the predicted trajectory of the selected VRU substantially crosses the second path.

15. The system of claim 13, wherein the computing device is configured to determine that the selected VRU is jaywalking when the predicted trajectory of the selected VRU substantially crosses the second path, and when the predicted trajectory of the selected VRU is substantially distal to the third path.

16. The system of claim 13, wherein the computing device is configured to determine that the selected VRU is jaywalking when the detected current trajectory of the selected VRU substantially matches the first path, when the predicted trajectory of the selected VRU crosses the second path, and when the predicted trajectory of the selected VRU is substantially distal to the third path.

17. The system of claim 13, wherein the computing device is configured to provide a danger notification pertaining to road usage safety in response to the determining that the selected VRU is jaywalking, wherein the danger notification includes an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof.

18. The system of claim 12, wherein the computing device is further configured to detect future trajectories of a subset of the plurality of vehicles which are proximal to the current trajectory of the selected VRU.

19. The system of claim 17, further comprising a wireless communications device configured to transmit the danger notification to the UE terminal of the selected VRU, the UE terminal of one of the plurality of vehicles proximal to the selected VRU, an advanced driver assistant system of one of the vehicles proximal to the selected VRU, a communications network infrastructure, a road traffic infrastructure proximal to the selected VRU, a pedestrian crosswalk infrastructure proximal to the selected VRU, a computer server, an edge computing device, an Internet of things (IoT) device, a fog computing device, a cloud computing device, any information terminal pertaining to the field of road safety, or a combination thereof.

20. A non-transitory computer readable medium comprising computer-executable instructions, when executed, configured to cause a processor to perform a method of automatically detecting jaywalking of a vulnerable road user (VRU), the method comprising:
storing, at a memory, past trajectory data of a plurality of vehicles and a plurality of VRUs, wherein each of the plurality of VRUs and each of the plurality of vehicles are linked to a long-term evolution (LTE)-capable user equipment (UE) terminal having an international mobile subscriber identity (IMSI);
detecting, at a computing device, a current trajectory of a first one of the plurality of VRUs;
first determining, at the computing device, whether the detected current trajectory of the first VRU substantially matches a first path taken by the plurality of VRUs less frequently than a first threshold value based on the past trajectory data of the plurality of VRUs;

in response to the detected current trajectory of the first VRU substantially matching the first path, tagging, at the computing device, the first VRU as a selected VRU;

obtaining, at the computing device, a predicted trajectory of the selected VRU;

second determining, at the computing device, whether the predicted trajectory of the selected VRU crosses a second path frequently taken by the plurality of vehicles more frequently than a second threshold value based on the past trajectory data of the plurality of vehicles, the second path being different from the first path;

third determining, at the computing device, whether the predicted trajectory of the selected VRU is substantially distal to a third path marked for VRU use; and fourth determining, at the computing device, whether the selected VRU is jaywalking based on one or more of the first determining, the second determining, and the third determining.

* * * * *